United States Patent
Doi et al.

(10) Patent No.: US 7,486,289 B2
(45) Date of Patent: Feb. 3, 2009

(54) RECOGNITION MODEL GENERATION AND STRUCTURED MESH GENERATION SYSTEM AND METHOD

(75) Inventors: Jun Doi, Yokohama (JP); Keisuke Inoue, Sagamihara (JP); Atsushi Yamada, Yokohama (JP); Takeo Yoshizawa, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 10/464,338

(22) Filed: Jun. 18, 2003

(65) Prior Publication Data

US 2004/0032408 A1 Feb. 19, 2004

(30) Foreign Application Priority Data

Jun. 19, 2002 (JP) ............................. 2002-178068

(51) Int. Cl.
*G06T 15/00* (2006.01)
(52) U.S. Cl. ..................................................... 345/419
(58) Field of Classification Search ................. 345/420, 345/423, 441, 443
See application file for complete search history.

(56) References Cited

U.S. PATENT DOCUMENTS

| | | | | |
|---|---|---|---|---|
| 5,402,531 | A * | 3/1995 | Tamura | 345/420 |
| 5,894,308 | A * | 4/1999 | Isaacs | 345/420 |
| 5,995,639 | A * | 11/1999 | Kado et al. | 382/118 |
| 6,535,211 | B1 * | 3/2003 | Hariya et al. | 345/423 |
| 6,697,078 | B2 * | 2/2004 | Becker et al. | 345/589 |
| 6,816,170 | B1 * | 11/2004 | Udeshi | 345/660 |

FOREIGN PATENT DOCUMENTS

| | | |
|---|---|---|
| JP | 02-236677 | 9/1990 |
| JP | 05-174111 | 7/1993 |
| JP | 06-180738 | 6/1994 |
| JP | 2000011206 A * | 1/2000 |

OTHER PUBLICATIONS

Higashi, M., Nakano, H., Nakamura, A. and Hosaka, M., "Use of Topological Constraints in Construction and Processing of Robust Solid Models" (ACM Symposium on Solid Modeling and Applications, 2001, pp. 18-29).*

* cited by examiner

*Primary Examiner*—Jin-Cheng Wang
*Assistant Examiner*—Said Broome
(74) *Attorney, Agent, or Firm*—F. Chau & Associates, LLC

(57) ABSTRACT

A recognition model generation system of the invention includes means 18 for labeling edges and faces of an input three-dimensional shape, means 20 for generating shape restriction values, shape restriction means 22 for restricting shape recognition using generated shape restriction values, and means 24 for generating position coordinates of vertexes of a shape that can be derived by substituting the input three-dimensional shape with hexahedrons using output from the shape restriction means. The invention also provides a method for generating a recognition model a program for causing a computer to execute the method, a computer-readable medium storing the program thereon, and a structured mesh generation system.

5 Claims, 20 Drawing Sheets

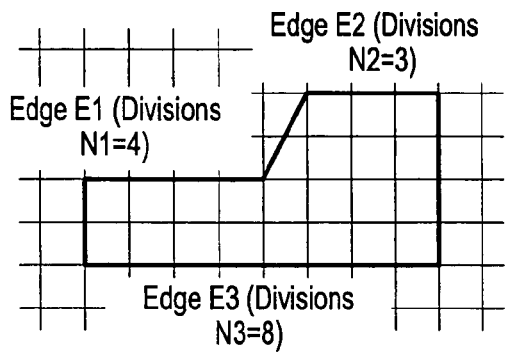
(a) Division into grids is impossible
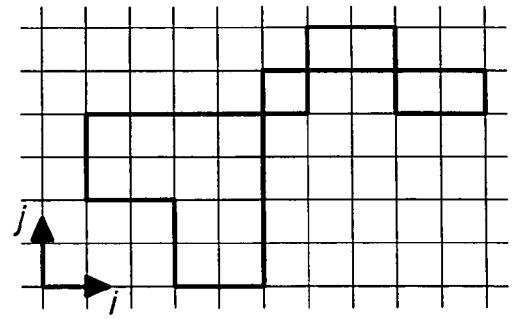
(b) Face has self-interference
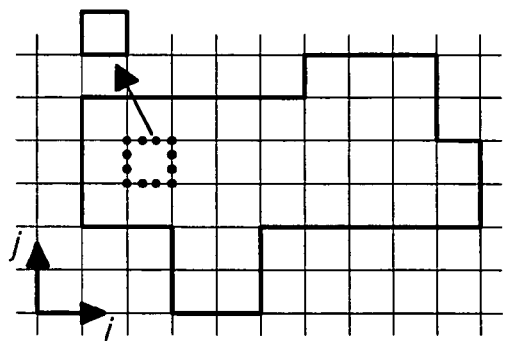
(c) Inner loop shifts outside outer loop
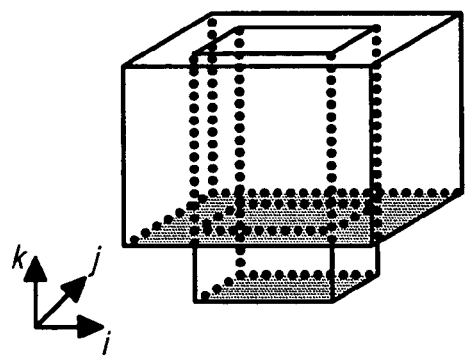
(d) Recognition model has self-interference despite no face has self-interference
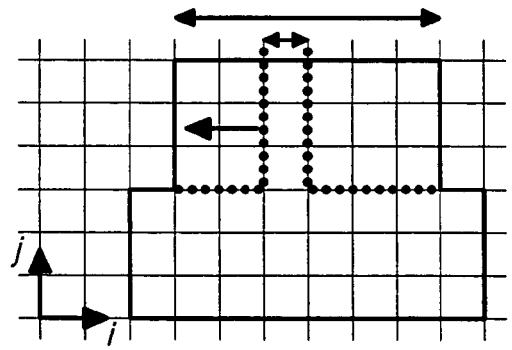
(e) Length of edge is widely different from that on actual model
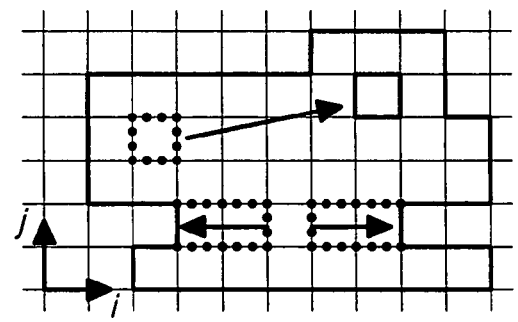
(f) Position of inner loop and distance between edges are widely different from those on actual model
FIG. 2

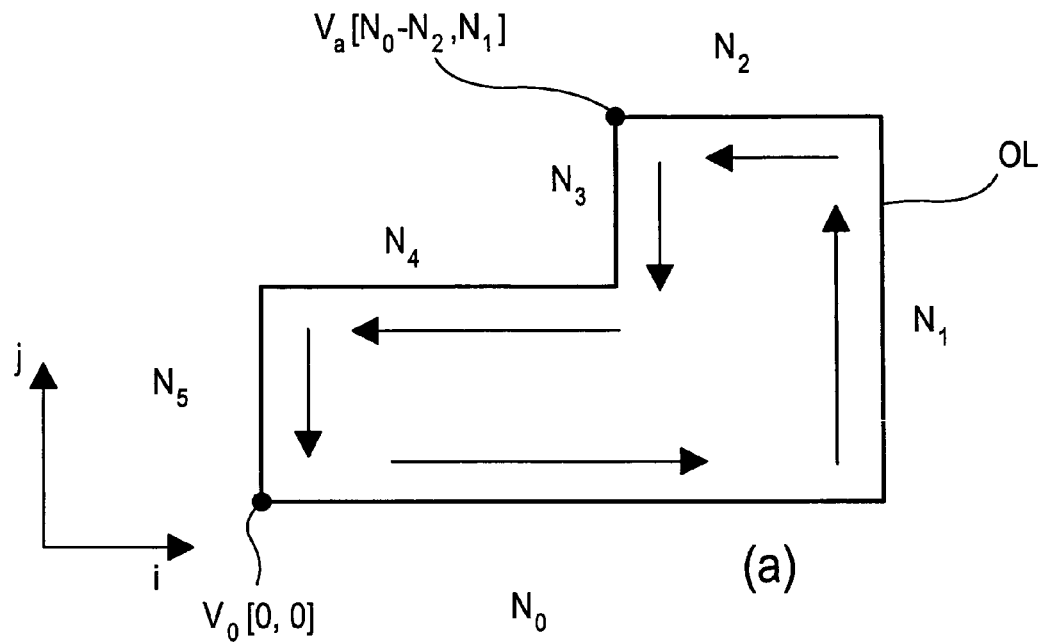
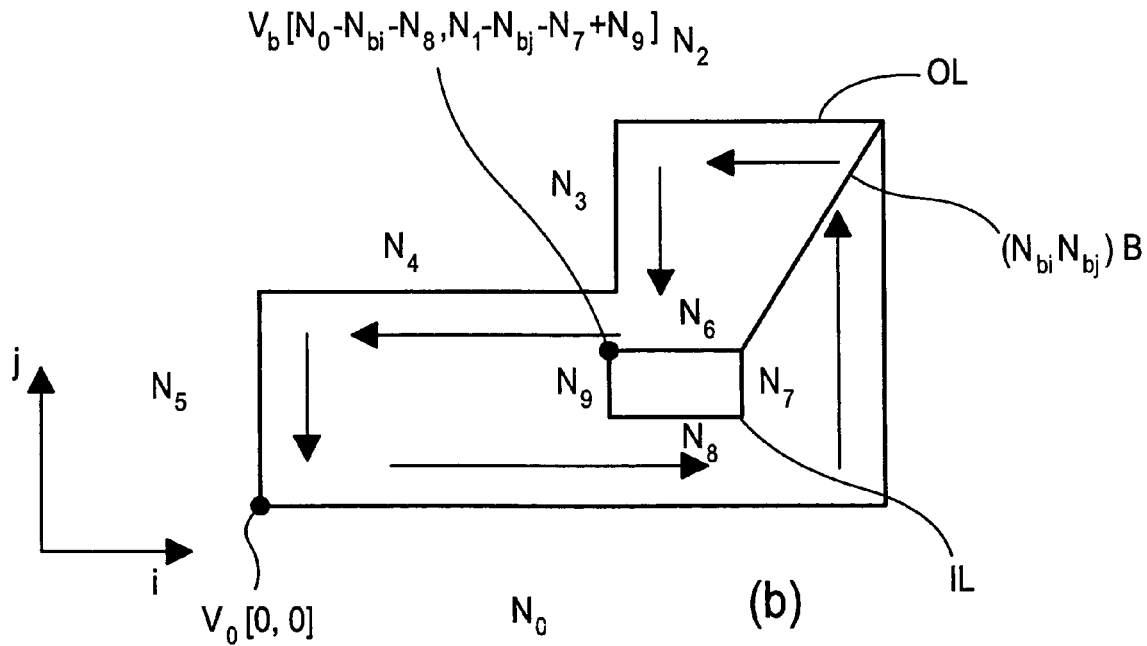
FIG. 3

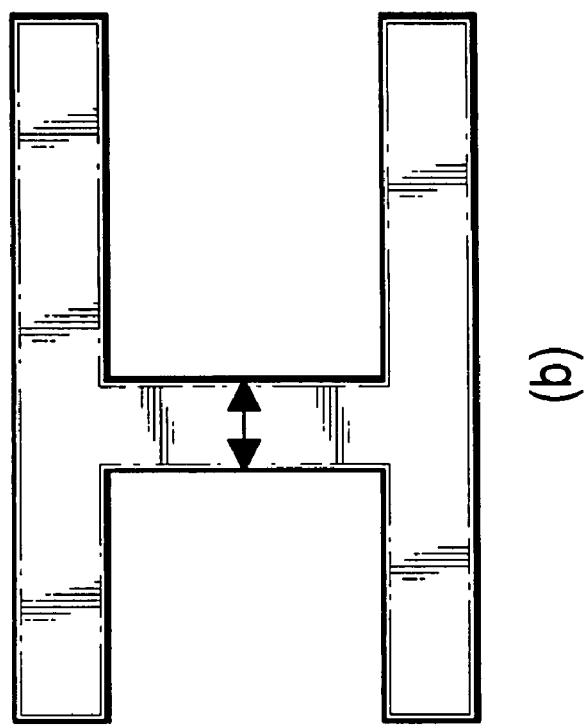
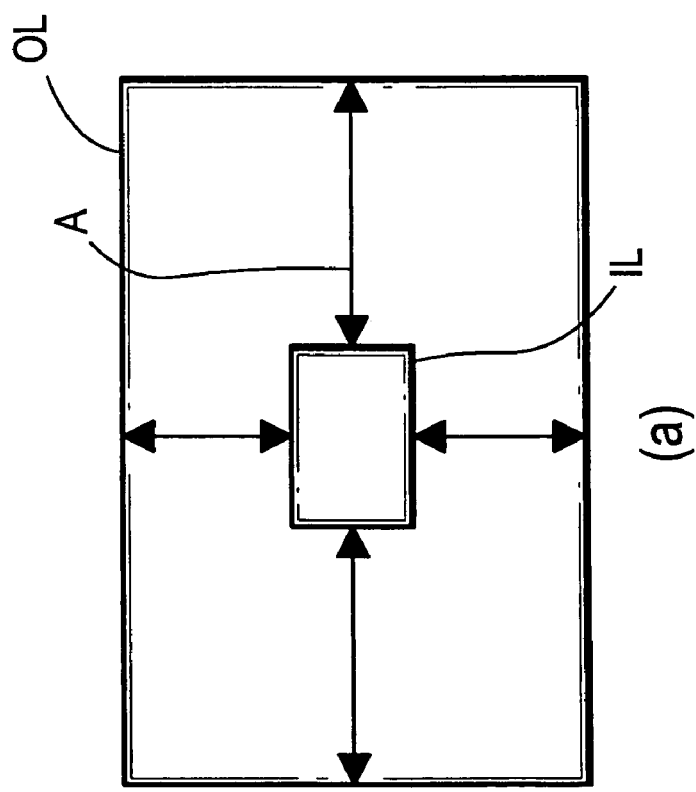
FIG. 5

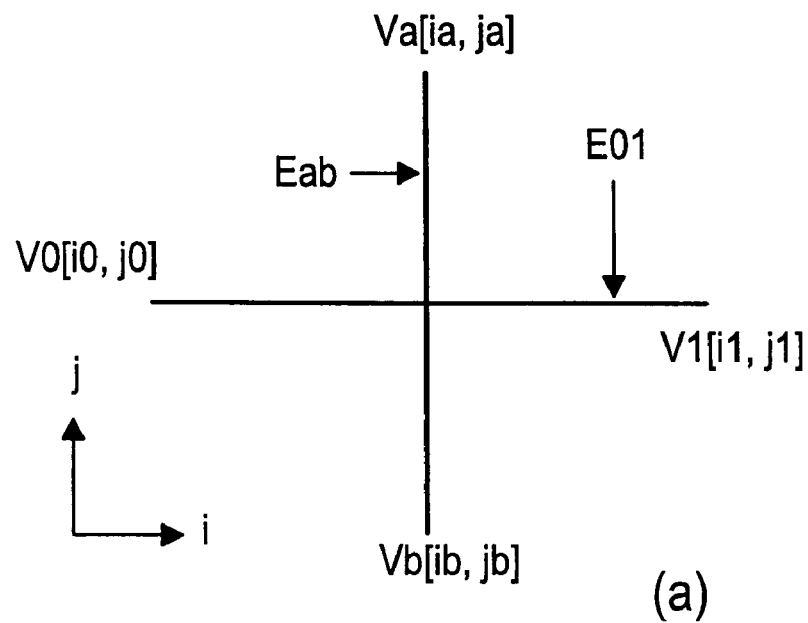
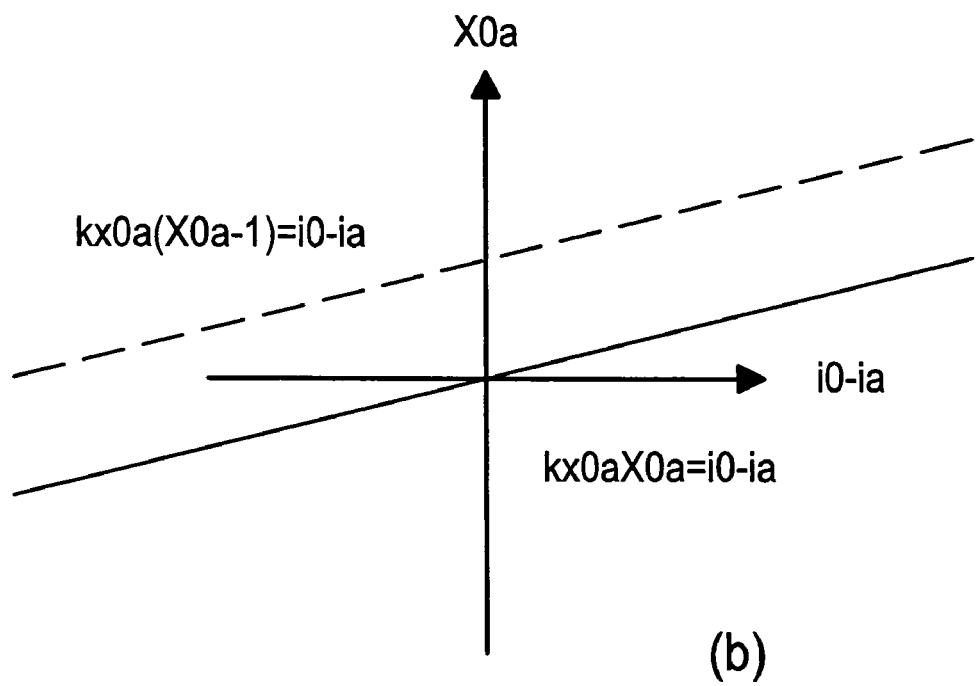
FIG. 7

```
while(1) {
    while (intersection of edges exists) {
                step of generating constraint for the edges not to intersect
                step of solving an integer programming problem
    }
    if (one point of an inner loop is outside the outer loop) {
                step of generating the point to be inside the outer loop
                step of solving an integer programming problem
    } else if (one point of an inner loop is inside another inner loop) {
                step of generating constraint for the point to be outside the inner loop
                step of solving an integer programming problem
    } else if (intersection of an edge and a face exists){
                step of generating constraint for the edge and the face not to intersect
                step of solving an integer programming problem
    } else {
        break;
    }
}
```

FIG. 13

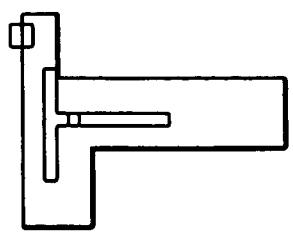
(a)
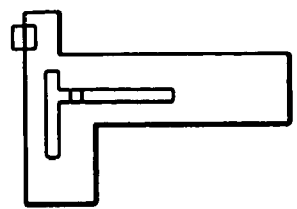
(b)
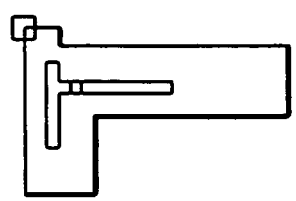
(c)
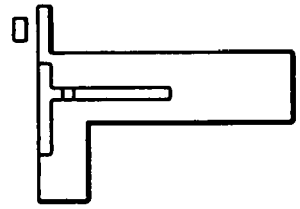
(d)
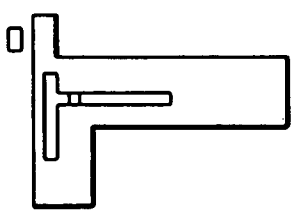
(e)
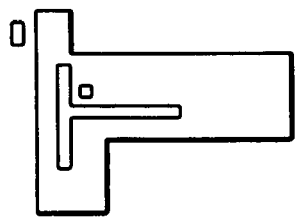
(f)
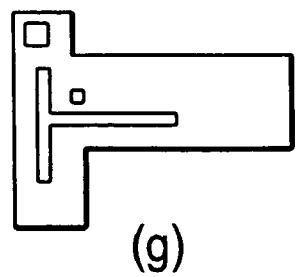
(g)
FIG. 17

Actual model (a)  Recognition model (b)

Target shape decomposed into a set of convex shapes in advance
(a)

The numbers of divisions for edges of each convex shape are calculated to generate a structured mesh.
(b)

(a)          (b)

RECOGNITION MODEL GENERATION AND STRUCTURED MESH GENERATION SYSTEM AND METHOD

CROSS-REFERENCE TO RELATED PATENT APPLICATIONS

This application claims priority to Japanese Patent Application No. 2002-178068, filed on Jun. 19, 2002, the disclosure of which is incorporated by reference herein in its entirety.

FIELD OF THE INVENTION

The invention relates to three-dimensional shape recognition with a computer, more particularly, to a recognition model generation system, a method for generating a recognition model, a program for causing a computer to execute the method for generating a recognition model, a computer readable storage medium storing the program, and a structured mesh generation system that enable generating a consistent recognition model from a three-dimensional shape more efficiently and generating a structured mesh by automatically modifying geometrical inconveniences in a three-dimensional shape recognized by a computer.

BACKGROUND ART

With the advance in computer technology in recent years, attempts have been made to recognize three dimensional shapes with a computer and apply the results to computer-aided design or CAD, texture mapping in computer graphics, finite element method and the like. For a computer to recognize three-dimensional shapes, a variety of recognition models have been employed such as by substituting a three-dimensional solid with a simpler figure such as a collection of cubes and having it recognized. A recognition model is generated using a solid that substantially represents the form of its input shape as intermediate data. A hexahedral mesh can be then generated by dividing the solid into a number of grids.

In general, a recognition model uses a solid that is defined in an integer space referenced as ijk space. All of the faces constituting the recognition model are defined to be parallel with any of ij, jk, and ki planes. At this point, a face that has the normal [i j k]=[1,0,0] is given the label "+I" as its attribute. As well, each of the faces is given any of the labels "+I", "−I", "+J", "−J", "+K", and "−K". Table 1 below shows the correspondence between each face and a normal defining the face.

TABLE 1

| Identification Label of Face | Corresponding Normal |
| --- | --- |
| +I | [1.0.0] |
| −I | [−1.0.0] |
| +J | [0.1.0] |
| −J | [0.−1.0] |
| +K | [0.0.1] |
| −K | [0.0.−1] |

A recognition model is also represented in a so-called half-edge data structure that comprises a shell, faces, loops, half edges, and vertexes. A shell is a collection of faces; a face is comprised of an outer loop and a number of inner loops; and a loop is defined as a sequence of half edges. In accordance with the definition of recognition models, each half edge is supposed to be parallel with any of the axes i, j, and k. A half edge with its orientation [1,0,0] is given the label "+I" as its attribute, and as with faces, each half edge is classified as having any of the attributes "+I", "−I", "+J", "−J", "+K" and "−K". FIG. 18 shows a recognition model and definition of labels to its faces and half edges. Unless orientations are not considered, the following description simply refers to a pair of corresponding half edges as an edge.

In general, a mesh generation method that uses a recognition model as intermediate data primarily comprises following four steps. FIG. 19 shows a conventional procedure of generating a recognition model. As shown, in generating a recognition model with a conventional method:

1) The surface of an inputted three-dimensional shape (FIG. 19($a$)) is classified into portions having any of the attributes "+I", "−I", "+J", "−J", "+K", and "−K" (FIG. 19($b$)). FIG. 19($b$) illustrates attributes labeled to respective faces and orientations of K, J, and I.

2) From the classified surface, a recognition model comprised of vertexes of hexahedrons is generated (FIG. 19($c$)). As previously mentioned, each face of the recognition model is mapped to one face of a three dimensional shape's surface, edges are mapped to the boundaries of planes, and vertexes are mapped to the corner points of faces.

3) A mesh of a given size is used to divide the recognition model into grids to represent the model as a hexahedral mesh (FIG. 19($d$)).

4) After fitting the hexahedral mesh in its inputted shape, smoothing process is applied for eliminating any distortions in the hexahedral elements to determine node coordinate values for the hexahedral mesh (FIG. 19($e$)).

Various methods for generating a recognition model as intermediate data for mesh generation have been proposed, including, inter alia, Takahashi et al., "Keijouninshikio mochiita sanjigen-jidou-yousobunkatu-sisutemu no kaihatu (A Three-Dimensional Automatic Mesh Generation System Using Shape Recognition Technique)", Transactions of the Japan Society of Mechanical Engineers (Series A), Vol. 59 (560), pp. 279-285, January 1993, Reza Taghavi, "Automatic Block Decomposition Using Fuzzy Logic Analysis" (9th International Meshing Roundtable, pp. 187-192, 2000), and, David R. White et al., "Automated Hexahedral Mesh Generation by Virtual Decomposition" (4th International Meshing Roundtable, 1995).

Takahashi et al. create a recognition model with any of the labels +I, −I, +J, and −J already assigned to each side of an inputted shape (an actual model). FIG. 20 illustrates the method of mesh generation by Takahashi et al. The number of segments belonging to each orientation is defined as Ns (s= (+I), (−I), (+J), or (−J)); the length of each side of an actual model is defined as ls,t(t=1, . . . , Ns); and the sum of the lengths of sides in each orientation is defined as Ls(s=(+I), (−I), (+J), or (−J)). On the other hand, the length of each side of a recognition model is defined as ms,t(t=1, . . . , Ns), and the sum of the lengths of sides in each orientation is defined as Ms(s=(+I), (−I), (+J), or (−J)). Ms,t is what need be determined. Since the definition of recognition models requires M(+I)=M(−I), M(+J)=M(−J), Ms is calculated with the following expression:

[Expression 1]

$$M(+I)=M(-I)=(L(+I)+L(-I))/2$$

$$M(+J)=M(-J)=(L(+J)+L(-J))/2$$

These expressions mean that Ms is determined as the average of opposite orientations. With these Ms values, ms,t can be derived using the following expression.

[Expression 2]

$$ms,t = Ms \times ls,t/Ls,t$$

$$(s=(+I), (-I), (+J), \text{or } (-J), t=1, \ldots, Ns)$$

The foregoing has shown how the length of each edge on a recognition model is calculated with the method proposed by Takahashi et al. This method, however, can be considered to merely calculate the lengths of edges on a recognition model so as to approximate them to the lengths of sides of an actual model, it thus does not ensure in any way that no between edges interference will occur on the recognition model.

As well, although the method by Taghavi et al. generates a recognition model as intermediate data, the method cannot address at all the problem of how to determine the number of divisions so that interference may not occur to a generated recognition model. And White discusses how hexahedrons can be generated inside a rectangular structured mesh when the rectangular structured mesh has been already provided on a surface. Since a structured mesh provided on a surface beforehand according to White already contains information on the number of divisions, the method can eliminate the necessity of calculating the number of divisions. However, White's method is disadvantageous in that it cannot be applied when a mesh on a surface has not been provided.

In addition, methods have been proposed that determine the number of edge divisions as an integer programming problem. Tam et al. (T. K. H. Tam, "Finite Element Mesh Control by Integer Programming", International Journal for Numerical Methods in Engineering, Vol. 36, pp. 2581-2605, 1993) and Scott et al. (Scott A. Mitchell ("High Fidelity Interval Assignment", 6th International Meshing Roundtable, 1997) propose methods for, when a coarse mesh has been already given, breaking it into a finer mesh. FIG. 21 shows how the method proposed by Tam et al. generates a structured mesh. Since Tam's method provides a coarse mesh in advance as shown in FIG. 21(a), it is assumed that the area has been divided into a set of convex shapes. The present case does not need the elimination of the interference of edges or faces since the interference of edges or faces has been already eliminated.

FIG. 22 illustrates another known method for determining the number of edge divisions as an integer programming problem. The mesh generation method in the FIG. 22, proposed by Mitchell (Scott A. Mitchell, High Fidelity Interval Assignment, 6th International Meshing Roundtable, 1997), addresses the determination of the number of divisions when a structured mesh and an unstructured mesh co-exist. However, the method only discloses the processing of convex shapes with respect to the generation of a structured mesh as with Tam.

Since many three-dimensional shapes have concave portions formed thereon, faces that include concave portions will be generated on a recognition model for a three-dimensional shape including concave portions. If a conventional method for generating a recognition model is applied to a three-dimensional shape that includes concave portions, an unexpected inconvenience may be encountered. FIG. 23 generally illustrates such an inconvenience as two-dimensional shapes for illustration. FIG. 23(a) shows an input shape and FIG. 23(b) shows a generated recognition model. With a conventional method, when the shape in FIG. 23(a) that includes a concave portion is input, degeneracy or interference of edges and faces can be generated depending on how the number of divisions is assigned to edges, potentially causing the inputted shape in FIG. 23(a) to give the inconsistent recognition model in FIG. 23(b). The example in FIG. 23 illustrates that the existence of a concave portion causes a mesh with degeneracy and interference. In the context of the invention, the degeneracy or interference of edges refers to edges overlapping one another or an edge intersecting with a face other than one that includes the edge. And the degeneracy or interference of faces means a face intersecting with another face or faces overlapping one another.

Although the conventional method in FIG. 23 addresses the inconvenience shown in FIG. 23(b) such as by a user manually generating an appropriate large mesh in advance, a computer could not determine the number of divisions in such a manner that degeneracy or interference would not occur to a solid that includes concave portions. Meanwhile, three-dimensional shapes that include concave portions as mentioned above can be seen commonly and is a general characteristic of various machine elements or real objects, making the problem of processing concave portions in conventional methods one of causes that limit generic applicability of recognition models.

That is, there has been a need that inconveniences with a recognition model such as degeneracy and interference can be automatically eliminated without producing situations such as one in which grids cannot generated because the numbers of divisions of opposite edges are unequal and thus an appropriate mesh for a three-dimensional solid cannot be generated. In addition, there has been a need that an appropriate recognition model for a three-dimensional solid can be generated and expressed as a mesh automatically with minimum manual operation.

The invention has been made in view of the above-mentioned disadvantages of the conventional methods, and has the object of providing a recognition model generation system, a method for generating a recognition model, a program for causing a computer to execute the method, a computer readable storage medium storing the program, and a structured mesh generation system that can divide an input three-dimensional shape appropriately and eliminate effort such as manually allocating a mesh without causing inconveniences like degeneracy and interference of faces or edges.

SUMMARY OF THE INVENTION

The invention has been made on the basis of an idea that, when a recognition model is divided into grids using a given mesh size to be represented as a structured mesh composed of hexahedrons in the generation of a recognition model as mentioned above, if a recognition model to be used as intermediate data could be generated by determining the number of divisions optimally and eliminating degeneracy and interference of edges and faces automatically, a desirable structured mesh could be automatically generated by a computer.

The invention uses labels applied to faces and edges of a recognition model to determine the topology of the recognition model such as the convexity and concavity of edges or convexity and concavity of vertexes within faces and generates an objective function and constraints. At the same time, the invention can carry out desirable shape recognition by restricting shape recognition of a recognition model, in addition to introducing topological relationships. The restriction of shapes can be attained by generating shape restriction values and adopting an objective function containing terms that use the shape restriction values. In the context of the invention, the shape restriction values mentioned above refer to in particular values that are used for the terms in the objective function used in the invention among respective values used in the objective function, and specifically, refer to values of estimated lengths of edges and values of estimated distances between edges or faces.

Moreover, by introducing topological relationships between edges and faces of a determined recognition model and automatically eliminating interference of edges or faces as mentioned above, the invention determines efficiently conditions under which degeneracy and interference can occur to a recognition model for a three-dimensional shape that includes convex or concave portions, and generates a recognition model with handling any produced degeneracy and interference and modifying an integer programming problem.

In a preferred embodiment of the invention, estimated lengths of edges and estimated distances between edges or between faces can be used as shape restriction values. According to the invention, it has been found out that a desirable recognition model for an input three-dimensional shape can be generated, as well as a desirable structured mesh can be automatically generated, by first restricting shape recognition with an objective function containing terms that use shape restriction values, and then dividing edges and faces so as to meet topological conditions.

The generated recognition model can be used as intermediate model in generating a structured mesh, allowing a topologically consistent and desirable structured mesh to be generated. The generated structured mesh can also give models for various dynamic analysis, structure analysis, strength analysis, and deterioration analysis using finite element method and the like. In addition, the generated recognition model can be suitably applied to surface rendering technique.

According to the invention, a system for automatically generating a recognition model of an input three-dimensional shape is provided, the system including:

means for identifying labels of edges and faces of the input three-dimensional shape;

means for generating shape restriction values based on the labels of edges and faces;

shape restriction means for restricting shape recognition using the generated shape restriction values; and means for generating position coordinates of the vertexes of the recognition model using output from the shape restriction means.

The means for generating shape restriction values of the invention includes means for generating estimated lengths of edges and means for generating estimated distances between edges or faces. The shape restriction means of the invention includes an objective function that contains a term relating to the absolute value of the difference between a generated estimated length of an edge and the length of the edge determined from the generated position coordinates, and a term relating the absolute value of the difference between an estimated distance and a distance determined from the position coordinates. The means for generating position coordinates of the invention further includes means for generating the position coordinates using constraints relating to the topology of edges and faces.

The recognition model generation system of the invention further includes means for determining the topological conditions for edges and faces based on data on the edges and faces. The input three-dimensional shape in the invention is preferably a shape that includes a concave portion.

According to the invention, a method for automatically generating a recognition model of an input three-dimensional shape is provided, the method including the steps of:

identifying the labels of the edges and faces of an input three-dimensional shape;

generating shape restriction values based on the labels of the edges and faces and storing the values;

reading the generated shape restriction values and restricting shape recognition; and generating position coordinates of the vertexes of a shape that can be derived by substituting the input three-dimensional shape with hexahedrons, using the shape restriction values.

According to the invention, a computer-executable program for executing a method for automatically generating a recognition model of an input three-dimensional shape is provided, the program causing a computer system to execute the steps of:

identifying the labels of the edges and faces of an input three-dimensional shape;

generating shape restriction values based on the labels of edges and faces and storing the values;

reading the generated shape restriction values and restricting shape recognition; and generating position coordinates of the vertexes of the recognition model using the shape restriction values.

According to the invention, a computer-readable storage medium that stores a computer-executable program for executing a method for automatically generating a recognition model of an input three-dimensional model is provided, the program causing a computer system to execute the steps of:

identifying the labels of the edges and faces of an input three-dimensional shape; generating shape restriction values based on the labels of edges and faces and storing the values;

reading the generated shape restriction values and restricting shape recognition; and generating position coordinates of the vertexes of the recognition model using the shape restriction values.

According to the invention, a system for automatically generating a structured mesh from a recognition model of an input three-dimensional shape is provided, the system including:

means for identifying the labels of the edges and faces of the input three-dimensional shape;

means for generating shape restriction values based on the labels of edges and faces;

shape restriction means for restricting shape recognition using the generated shape restriction values; and means for generating position coordinates of the vertexes of respective hexahedrons in a shape that can be derived by substituting the recognition model with hexahedrons, using output from the shape restriction means, wherein the means for generating shape restriction values includes:

means for generating estimated lengths of edges, and means for generating estimated distance between edges or faces.

BRIEF DESCRIPTION OF THE DRAWINGS

FIG. 2 generally illustrates aspects of constraint occurrence;

FIG. 3 illustrates the step of adding a bridge edge to a recognition model in the invention;

FIG. 5 illustrates in two dimensions an example of a recognition model that requires a term for a distance between edges to be added to an objective function;

FIG. 7 generally illustrates the determination of edge intersection in the invention;

FIG. 13 shows an embodiment of a pseudo code for executing the process from steps S50 to S54 in FIG. 12 in the invention;

FIG. 17 illustrates an example of generating the recognition model of FIG. 16(*c*) with the method of the invention;

PREFERRED EMBODIMENTS OF THE INVENTION

In the following, the invention will be described with reference to specific embodiments illustrated in the appended drawings, however, the invention is not intended to be limited to the embodiments to be described. Summarizing the method for generating a recognition model according to the invention, the method first calculates ijk coordinate values for the vertexes of a recognition model by solving an integer programming problem using the numbers of edge divisions on a recognition model as variables. An integer programming problem is generally a problem that determines integer variables x1, . . . , xn that meet constraints and minimize an objective function z, as shown by the expression below.

Objective Function:

[Expression 3]

$$\text{minimize } z = \sum_{j=1}^{n} c_j x_j \quad (1)$$

Constraint:

[Expression 4]

$$\sum_{j=1}^{n} a_{ij} x_j \le b_i, i = 1, \ldots, m_1 \quad (2)$$

$$\sum_{j=1}^{n} a_{ij} x_j = b_i, i = m_1 + 1, \ldots m$$

$$x_j \ge 0, j = 1, \ldots n$$

$$x_j \in Z, j = 1, \ldots, n_1 \le n$$

In the expression (2), ci, aij, and bi represent constants and Z represents the set of entire integers.

Figure 1:
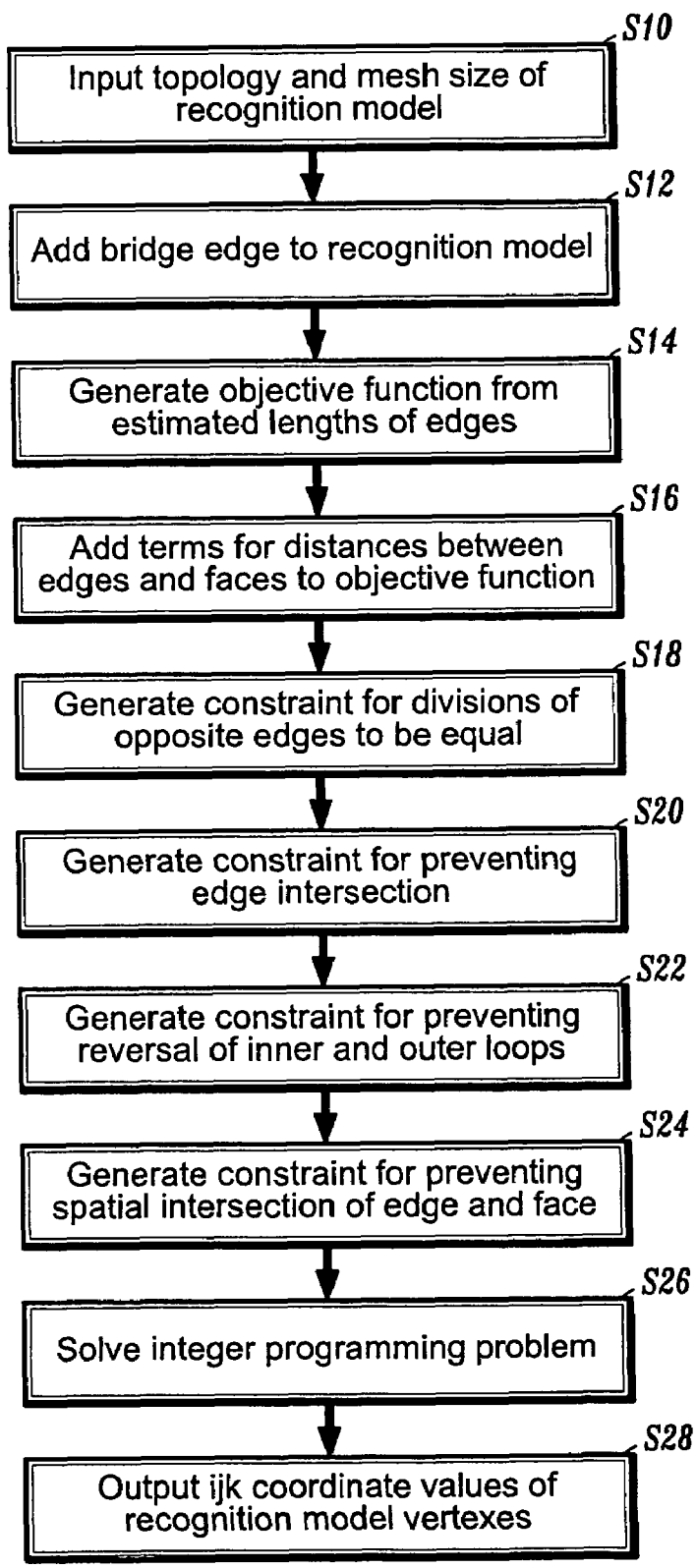
FIG. 1 is a flowchart generally showing the process of the method for generating a recognition model of the invention.

FIG. 1 illustrates a flowchart showing the general process of a recognition model generation method according to the invention. At step S10, the process in FIG. 1 first receives input data on an inputted three-dimensional shape such as a mesh size and the edges and faces of the shape to be used for its recognition model and identifies labels assigned to the faces and edges. In another embodiment of the invention, however, it is also possible to automatically generate labeling of edges and faces from data on an input three-dimensional shape and identify the generated labels to use them for subsequent processing. One classification of the three-dimensional shape surface that is classified as a face in the input data corresponds to a face of its recognition model, an edge is classified into a boundary, and a vertex corresponds to a corner point of the recognition model. The process in FIG. 1 then proceeds to step S12 to add a bridge edge to the recognition model. Step S12 is required to compute the position coordinates of an inner loop as discussed later. Then, an objective function relating to estimated lengths of edges is generated at step S14, and estimated distances between edges or faces are generated at step S16, adding these elements as objective functions.

From step S18 to S24, constraints that include topological conditions necessary to automatically eliminate degeneracys and interference in the invention are included in an integer programming problem. These steps are adopted so that concave shapes can be handled in the invention especially. These steps will be described later. A recognition model is then generated at step S26 by solving the integer programming problem using the conditions included at steps S14 to S24, and the ijk coordinate values for the vertexes of the recognition model are output at step S28. Before turning to the details of the process in FIG. 1, the degeneracy and interference of edges and faces, and conditions for deriving proper number of divisions in the invention will be now described generally.

FIG. 2 illustrates situations (topological conditions) in which the afore-mentioned degeneracy and interference of edges and faces occur, and ones in which a shape is incompletely recognized. The figure generally shows occurrence of constraint for degeneracy of edges and faces. FIGS. 2(*a*) to 2(*d*) show states relating to topological conditions, and 2(*e*) to 2(*f*) show states resulting from incompleteness of shape recognition. Referring to FIG. 2, FIG. 2(*a*) is a case where the sums of the numbers of edge divisions at opposite sides are not equal. As shown in FIG. 2(*a*), the edges E1 and E2 have seven divisions in total, whereas the edge E3 has eight divisions. As a result, the recognition model cannot be divided into a mesh in the case of FIG. 2(*a*). FIG. 2(*b*) illustrates interference occurring in a face making up a recognition model, and 2(*c*) illustrates a state where topology is inverted between loops within a face composing a recognition model.

Either of these states would prevent division into an appropriate mesh. The case shown in FIG. 2(d) illustrates a situation that the recognition model has a spatial interference even though all the faces constituting the model are free of problems, also resulting in an inconvenience that division into grids cannot be carried out.

As an example of incomplete shape recognition, FIG. 2(e) shows a case where the length of an edge is significantly different from that of an input shape (an actual model). In such a case, a resulting mesh will be a widely distorted one. In addition, as FIG. 2(f) shows, there exists another aspect of incomplete shape recognition that a distance between edges or positional relationship of an inner loop on a recognition model is much different from that on an actual model. The case in FIG. 2(f) is different from FIG. 2(e) in that it does not have one corresponding edge. Such a case will also finally produce a significantly distorted mesh.

The inventors have found out through close study as follows and attained the invention: the topological problems, i.e. degeneracy and interference illustrated in FIGS. 2(a) to 2(d) among the six types of problems above, can be adequately addressed by incorporating additional constraints into the integer programming problem; and the incompleteness of shape recognition shown in FIGS. 2(e) and 2(f) can be resolved with enough degree of accuracy by using in an integer programming problem an objective function that contains terms related to estimated lengths of edges and estimated distances between edges or faces. In the following, the method for generating a recognition model according to the invention will be described based on the afore-mentioned constraints and objective functions.

A. Step of Adding a Bridge Edge to a Recognition Model

Here, the number of divisions of edges on a recognition model is defined as Ns(s=1, ..., n), and a recognition model having no inner loops in any of its faces will be considered. Assuming that any one of the recognition model's vertexes is the origin [i,j,k]=[0,0,0], the ijk coordinate values of other vertexes can be represented with the number of edge divisions. For the sake of simplicity, this will be described with a two-dimensional case in ij space shown in FIG. 3. FIG. 3(a) shows a recognition model prior to adding edges, and FIG. 3(b) shows a recognition model with a loop inside to which an edge has been added by the invention.

Assuming that the vertex V0 is the origin of the recognition model in FIG. 3(a), the coordinate values for the vertex Va will be [N0−N2, N1]. Whereas, when a face of the recognition model has an inner loop IL, its relative position relationship cannot be expressed with the number of edge divisions since the inner loop IL and an outer loop OL are not connected by an edge. The invention accordingly introduces a virtual edge called a bridge edge B as shown in FIG. 3(b). The bridge edge B is an edge that connects a vertex on the outer loop OL and a vertex on the inner loop IL, assigned with the number of divisions for two coordinate directions. The number of bridge edges B to be introduced is preferably the minimum number necessary to connect a vertex on the recognition model with another vertex through edges. Describing this with a two-dimensional example in ij space in FIG. 3(b) for simplicity, since the bridge edge is assigned with position coordinates Nbi, Nbj, the ij coordinate values for the vertex Vb can be expressed as [N0−Nbi−N8, N1−Nbj−N7+N9] with the vertex V0 as the origin.

Figure 4:
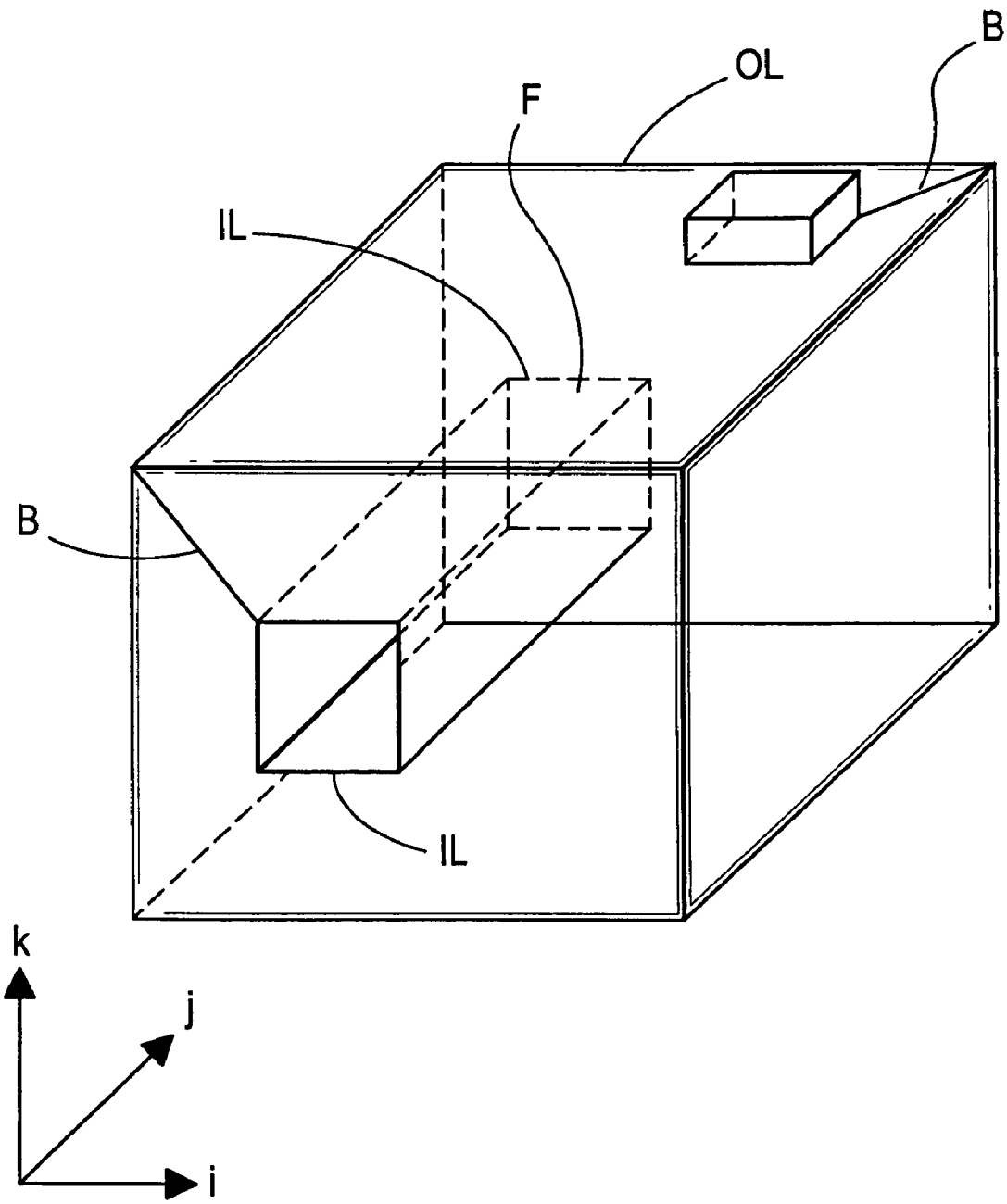
FIG. 4 illustrates an embodiment of adding an edge to a three-dimensional recognition model.

FIG. 4 illustrates an embodiment in which an edge is added to a recognition model that is a three-dimensional solid. The recognition model in the figure has an inner loop IL also on a face F on its back. Since the positional relationship between the inner loops IL and the outer loop OL can be determined via a bridge edge on the front face, a bridge edge need not be introduced on the back face F. By introducing the bridge edge B in such a way, and with any one of the vertexes of the recognition model defined as the origin [i,j,k]=[0,0,0], the values of ijk coordinates for all of other vertexes can be expressed using the number of edge divisions.

The bridge edge generated at step S12 will be used to convert ijk coordinate values of vertexes to the number of divisions at steps in FIG. 1 (steps S14, S20, and S22). It is for the reason that although steps S14, S20 and S22 once describe constraint condition expressions and an objective function as the relationship between ijk coordinates values, it is necessary to convert the ijk coordinate values to expressions for the number of edge divisions since an integer programming problem uses the number of edge divisions as variables.

Meanwhile, step S24 conversely employs a bridge edge generated at step S12 to convert the number of edge divisions to the ijk coordinate values for vertexes. The solution of the integer programming problem is determined as the value of the number of edge divisions. The bridge edge generated at step S12 can be used to calculate the ijk coordinate values of vertexes from the determined number of divisions. Step S12 executes processing as follows:

1) All inner loops are placed in a list.
2) The inner loops are retrieved from the list one by one, and following processing is repeated until the list is emptied.
   2-1) One vertex of an inner loop and one vertex of an outer loop to which the inner loop belongs are selected.
   2-2) It is checked if an edge sequence connecting the two points exists.
   2-3) If such an edge sequence does not exist, a bridge edge that connects the two vertexes is added to the recognition model.
   2-4) If such an edge sequence exists, the next inner loop is processed.

B. Step of Generating an Objective Function from Estimated Lengths of Edges

The processing at step S14 in FIG. 1 being an essential step for solving the problem shown in FIG. 2(e), estimated lengths of edges can be used as shape restriction values in a preferred embodiment of the invention, and in a more specific embodiment, a value determined by dividing the estimated length Lj' of each edge (j=1, ..., n) by a mesh size M can be used as Nj' (j=1, ..., n). This value represents an estimated number of divisions of each edge, that is, the number of polygonal lines. The processing done at step S14 intends to generate an objective function so that the difference between the estimated number of divisions Nj' and the number of divisions Nj that is finally determined may be minimized. A first method according to the invention generates a term relating to the absolute value of the estimated length of an edge in the objective function expressed with the expression below.

[Expression 5].

$$Z = \sum_{j=1}^{n} w_j |N_j - N_j'| \qquad (3)$$

In the expression, wj is a weighting factor. Although the expression contains an absolute value, it can be converted to a linear expression. In that process, non-negative auxiliary variables rj_p, rj_mn are newly introduced. With these auxiliary variables, the objective function shown above can be rewritten as a pair of an objective function expressed by the expression right below and a constraint expressed by the other expression below.

Objective Function:

[Expression 6]

$$z = \sum_{j=1}^{n} w_j(r_{j\_p} + r_{j\_m}) \quad (4)$$

Constraint:

[Expression 7]

$$N_j - N_j' = r_{j\_p} - r_{j\_m} (I=1, \ldots, n) \quad (5)$$

This decomposition can be done because the ultimate solution has the minimum value of the objective function, thus making either of rj_p or rj_m zero, that is, if Nj>Nj', then rj_p>0, rj_m=0, and if Nj'<Nj, then rj_p=0, rj_m>0. Wj in the expression above is also a weighting factor, and it has greater effect per one division for an edge with smaller Nj', therefore it is preferable that an edge with smaller Nj' has a larger weighting factor wj. In a particular embodiment of the invention, wj=1/Nj' can be employed as a weighting factor, for example.

In another embodiment of the invention, the expressions below may be used as terms relating to the absolute value of an estimated length of an edge.

[Expression 8]

$$z = \max_{j=1,\ldots n} (w_j(r_{j-p} + r_{j-m})) \quad (6)$$

[Expression 9]

$$z = z' \quad (7)$$

[Expression 10]

$$w_j(r_{j\_p} + r_{j\_m}) \leq z, j=1, \ldots n \quad (8)$$

In a preferred embodiment of the invention, z is a minimum sum of the difference from the estimated number of divisions. In another embodiment of the invention, however, it is also possible to use a method that makes z the maximum value of the difference from the estimated number of divisions and minimizes z.

C: Step of Adding a Term for a Distance Between Edges to the Objective Function

Step S16 is a second essential step adopted to solve the problem in FIG. 2(f), generating shape restriction values. At step S14, an estimated number of divisions was calculated for each edge and a term that minimizes the absolute value of the difference between the estimated number of divisions and the number of divisions resulting from generated positional coordinates was added to the objective function. The step discussed in this section C involves generating distances between edges and between faces as shape restriction values and adding terms using these variables to an objective function. FIG. 5 illustrates an example of a recognition model in two dimensions that requires terms relating to the absolute values of the distances between edges and between faces to be added to the objective function. Referring to FIG. 5, when the distance between edges designated by arrow A is not incorporated to the objective function, the position of the outer loop OL relative to the inner loop IL may differ from that in a three dimensional shape, as in FIGS. 5(a) and (b). Since both of the inner loop IL and the outer loop OL are topologically free of such conditions as degeneracy and interference, if conventional constraints are used to generate a recognition model, a resulting mesh would be a distorted one.

Step S16 in FIG. 1 calculates the estimated number of divisions of two edges and adds them to the objective function for a portion having no edge like the example indicated by arrow A in FIG. 5. This process eliminates incompleteness of shape recognition as described above, rather than being a step necessary for generating a recognition model that is topologically consistent.

To determine a distance between edges or faces, the invention can use Medial Axis or Chordal Axis to calculate an estimated distance for a portion with no edge. This method has been conventionally used for calculation of the central axis of a shape. The invention has found out that surprisingly it is possible to eliminate inconveniences in recognition of a recognition model shape by employing as an objective function a distance between edges or faces along with an estimated edge length in generating a recognition model. In the following, a processing method using discrete Chordal Axis will be described. Although the following description will use ij plane for simplicity, estimation may be carried out in a similar way for jk, ki planes.

Figure 6:
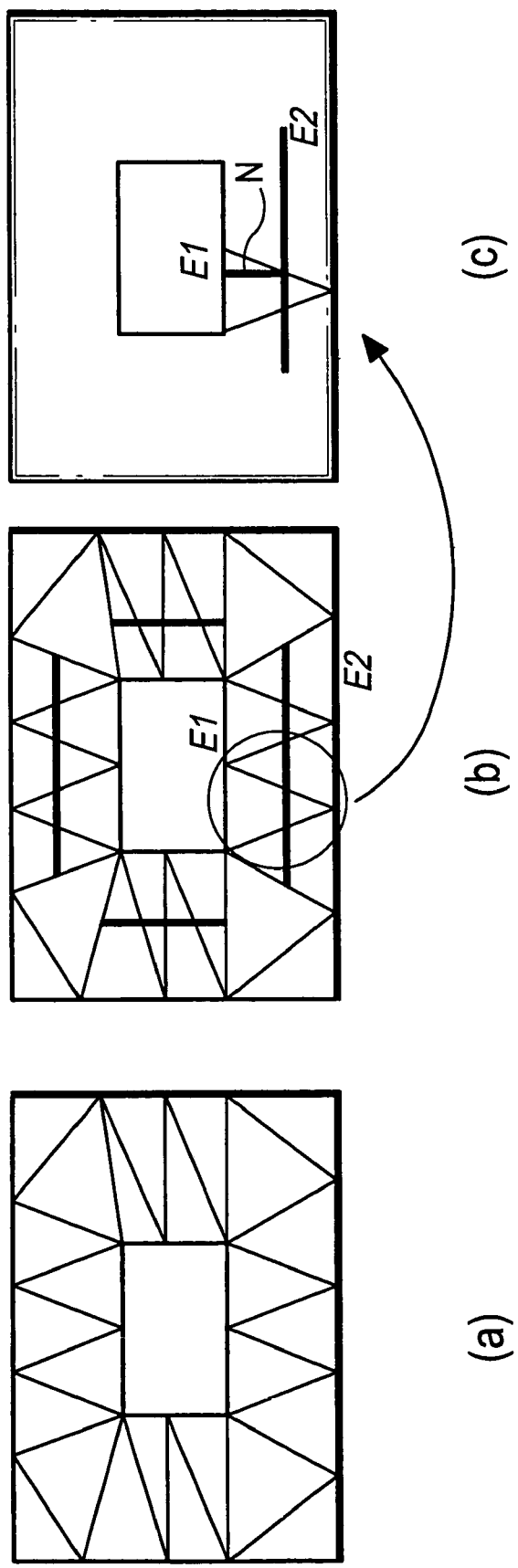
FIG. 6 illustrates a step of adding a term for the distance between edges to an objective function in the invention.

Here, one ij face of a recognition model will be considered. A portion of an input shape surface corresponds to the ij face and the boundary portions of the surface correspond to the edges of the ij face. The portion of the shape surface corresponding to the ij face is projected onto a plane. FIG. 6 illustrates this processing. FIG. 6(a) illustrates Delaunay triangulation, and FIGS. 6(b) and (c) generally show a processing method using Chordal Axis. As FIG. 6(a) shows, enough points are given only to the boundaries of the two-dimensional shape area projected onto a plane to carry out Delaunay triangulation. Then, as shown in FIG. 6(b), only triangles whose one side defines an area boundary are selected from the generated triangles. Those triangles can be grouped into triangles that connect particular two edges.

It is assumed here that the triangles have been created between the edges E1 and E2 as boundaries, as shown in FIG. 6(b). For each of these triangles, a segment is generated that connects midpoints of two sides that are not on the boundaries as shown in FIG. 6(b). Then, a normal N is drawn from each endpoint of the generated segment to a side on the boundary, as shown in FIG. 6(c). All normals in the triangles that connect edge E1 and E2 are averaged and a value double the average value is used as the estimated distance between the edge E1 and E2, so that the distance between the edges is estimated. The estimated distance is divided by a given mesh size to derive a value N', and the absolute value of the difference between the number of divisions of the edges E1 and E2 and N' is added as the second term to the object function described in relation to step S14 in the form of addition. By performing this process for all triangles in the ij face, the term for the distance between edges can be added to the objective function for one face. That is, the objective function used in the invention includes the term relating to the absolute value of the estimated edge length expressed as the expression (3) or (5), and the term relating to the absolute value of the difference between the estimated distance between edges or faces mentioned above and the distance between the edges E1 and E2. This objective function is minimized to generate an optimal recognition model.

The invention can estimate a distance between edges by performing the above-mentioned process for all of recognition model faces. A distance between faces can be determined using a distance between edges that are projected when a portion of a solid is projected onto a plane in the preferred embodiment described above. In addition, in another aspect of the invention, similar Delaunay triangulation may be applied between faces without performing projection for faces.

D. Step of Generating the Constraint for the Numbers of Divisions of Opposite Edges to be Equal Step S18 in FIG. 1 is for determining the state of FIG. 2(a) and solving the problem. Step 18 generates constrains that prevents such a condition that the total numbers of divisions for opposite edges in a face are not equal as in FIG. 2(a). As described above, loops that constitute a recognition model exists in any of ij, jk, and ki planes. Although, only a case with ij plane will be described for simplicity in the following, constraints can be generated in a similar way for other planes in the invention.

One loop on ij plane will be considered. As already mentioned, an edge that constitutes a loop has any of the labels "+I", "−I", "+J", and "−J". Step S18 generates the condition that the total number of divisions for edges with the label "+I" is equal to that for edges with the label "−I", and similar ones for the labels "+J" and "−J", which can be expressed with the expressions below.

[Expression 11]

$$\sum_{c1: \text{ for each}+i \text{ edge of loop}} N_{c1} = \sum_{c2: \text{ for each}-i \text{ edge of loop}} N_{c2} \qquad (9)$$

$$\sum_{c3: \text{ for each}+j \text{ edge of loop}} N_{c3} = \sum_{c4: \text{ for each}-j \text{ edge of loop}} N_{c4}$$

Using the conditions, step S18 performs processing as follows:

1) All the loops that constitute a recognition model are placed in a list.

2) The loops are retrieved from the list one by one, and the process below will be repeated until the list is emptied.

2-1) The two conditions in the expressions (9) are added to constraints for an integer programming problem for each loop.

E. Step of Generating Constraints for Edges not to Intersect

This step corresponds to step S20 in FIG. 1 and is for determining the state of FIG. 2(b) and solving the problem, generating the constraints for preventing edges on a recognition model from intersecting one another. As mentioned above, loops that constitutes a recognition model has any of the labels ij, jk, and ki planes. This section E will describe only the case with ij plane for the sake of simplicity, however, constraints may be created in a similar way for other planes.

Any edge constituting a loop has been assigned with any of the labels "+I", "−I", "+J", and "−J" as described earlier. FIG. 7 schematically illustrates the determination of edge intersection. FIG. 7(a) shows intersecting edges, and FIG. 7(b) shows how to determine the intersection. As FIG. 7(a) shows, in a preferred embodiment of the invention, one edge that is parallel with the i axis is defined as E01, its endpoints as V0[i0, j0], V1[i1,j1] (i1>i0), an edge parallel with the j axis as Eab, and its endpoints as Va[ia,ja], Vb[ib,jb] (ja>jb). The condition for these two edges to intersect is:

[Expression 12]

$$i_0 \leq i_a \leq i_1, j_b \leq j_0 \leq j_a \qquad (10)$$

and the condition for them not to intersect is:

[Expression 13]

$$i_0 - i_a > 0, \text{ or } i_a 31 \ i_1 > 0, \text{ or } j_b - j_0 > 0, \text{ or } j_0 - j_a > 0 \qquad (11)$$

Here, variables X0a, X1a, Y0b, and Y0a that meet following conditions are newly generated.

[Expression 14]

$$X_{0a} = \begin{cases} 1 (\text{if } i_0 - i_a > 0) \\ 0 (\text{otherwise}) \end{cases}, \qquad (12)$$

$$X_{1a} = \begin{cases} 1 (\text{if } i_a - i_1 > 0) \\ 0 (\text{otherwise}) \end{cases},$$

$$Y_{0b} = \begin{cases} 1 (\text{if } j_b - j_0 > 0) \\ 0 (\text{otherwise}) \end{cases},$$

$$Y_{0a} = \begin{cases} 1 (\text{if } j_0 - j_a > 0) \\ 0 (\text{otherwise}) \end{cases},$$

Using the variables X0a, X1a, Y0b, and Y0a above, the condition for the two edges not to intersect can be expressed as one linear inequality below. This is because the two edges cannot intersect when the value of any of the variables X0a, X1a, Y0b, and Y0a is 1.

[Expression 15]

$$X_{0a} + X_{1a} + Y_{0a} + Y_{1a} > 0 \qquad (13)$$

Then, the condition expressed as the expression (12) that the variables X0a, X1a, Y0b, and Y0a should meet is converted to a linear equation. Referring the variable X0a as an example, as shown in FIG. 7(b) the value that X0a can assume is narrowed to two values 0 and 1, by generating an upper limit line (the dotted line in FIG. 7(b)) and a lower limit line (the solid line in FIG. 7(b)) that are sufficiently smooth and introducing them to the equation. Converting the expression (12) to a linear expression in accordance with this approach, the expression below can be derived:

[Expression 16]

$$kx_{0a}X_{0a} \geq i_0 - i_a, kx_{0a}(X_{0a}-1) < i_0 - i_a,$$

$$kx_{1a}X_{1a} \geq i_a - i_1, kx_{1a}(X_{1a}-1) < i_a - i_1,$$

$$ky_{0b}Y_{0b} \geq j_b - j_0, ky_{0b}(Y_{0b}-1) < j_b - j_0,$$

$$ky_{0a}Y_{0a} \geq j_0 - j_a, ky_{0a}(Y_{0a}-1) < j_0 - j_a \qquad (14)$$

In these expressions, kxOa is a constant that has a value large enough compared with the value that i0−ia can assume. If solving the integer programming problem results in the value |i0−ia| larger than kx0a, another value of k0a is used to solve the integer programming problem again, and processing of the integer programming problem is repeated so that the expressions (11) and (12) are met. The same applies to kx1a, ky0b, and ky0a. In conclusion, the expressions (11) and (12) make the constraints for the two edges E01 and Eab not to intersect.

The procedure at step S20 involves adding constraints equivalent to the expressions (11) and (12) for combinations of edges constituting each face. However, with the processing method at step 20 described above, the number of constraints can significantly increase depending on the combinations of edges. To eliminate this inconvenience, in other aspects of the invention, it is preferable to add constraints by solving the integer programming problem once and adding constraints corresponding to the expressions (11) and (12) only for edge pairs to which intersection have occurred. How this process can be performed will be described in more detail later as a second embodiment of the invention.

F: Step of Generating the Constraints for Preventing Reversal of Inner Loops and an Outer Loop This step corresponds to step S22 in FIG. 1, determining the state of FIG. 2(c) and solving the problem. Step S22 determines that an inner loop IL does not shift outside the outer loop OL, and generates constraints for an inner loop IL not to be outside the outer loop OL and constraints for an inner loop not to be included in another inner loop. Since the condition for preventing edge intersection has been added as a constraint at step S20, step S22 can determine that any one of the vertexes of a loop is inside (or outside) another loop and could add a constraint depending on the determination. It is for this reason that when only the vertex is inside (or outside) and other vertexes are outside (or inside), intersection of edges will occur, thus allowing the above-mentioned state to be avoided with the constraint for preventing edge intersection.

In this case as well, loops that constitute a recognition model are contained in any of ij, jk, and ki planes. Although the following description will only address the case with ij plane, constraints may be generated in a similar way for cases with jk and ki planes.

Figure 8:
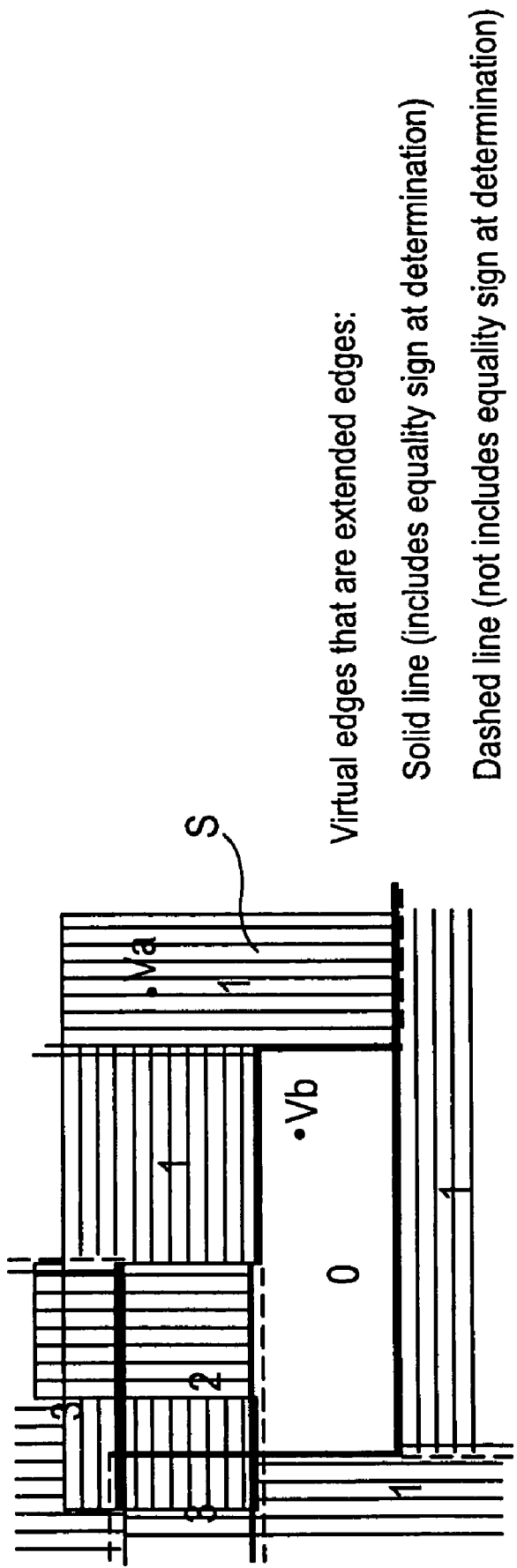
FIG. 8 generally illustrates the method of determining whether a point is inside or outside a loop that may be used with the invention.
Figure 9:
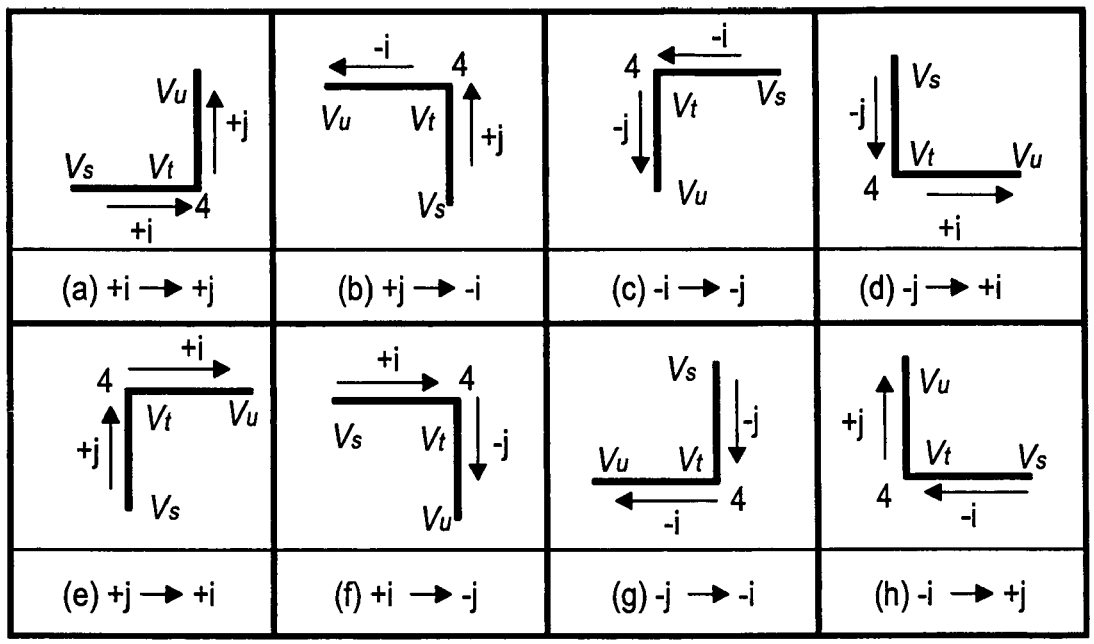
FIG. 9 shows classifications of three vertexes Vs, Vt, and Vu that are successive in the counterclockwise direction of a loop in the invention.

FIG. 8 generally illustrates a method for determining if a point is inside or outside a loop that can be used at step S22. To determine that a vertex Va[ia, ja] is inside (or outside) a loop that is defined by vertexes V1[i1, j1], ... ,Vn[in, jn], the invention uses concavity and convexity of the vertexes to determine if it is inside or outside the loop. The invention first sets the index value to 0, and, for a sector area S on each vertex (a hatched area resulting from extending edges as in FIG. 8), adds 1 to the index value if the point Va is inside the sector area S, and adds 0 if Va is not inside the sector area S. In a preferred embodiment of the invention, one side of the sector area S is treated as outside in order to avoid double-counting of the index. However, other embodiments that treat one side of the sector area S as inside can also provide similar results.

Figure 10:
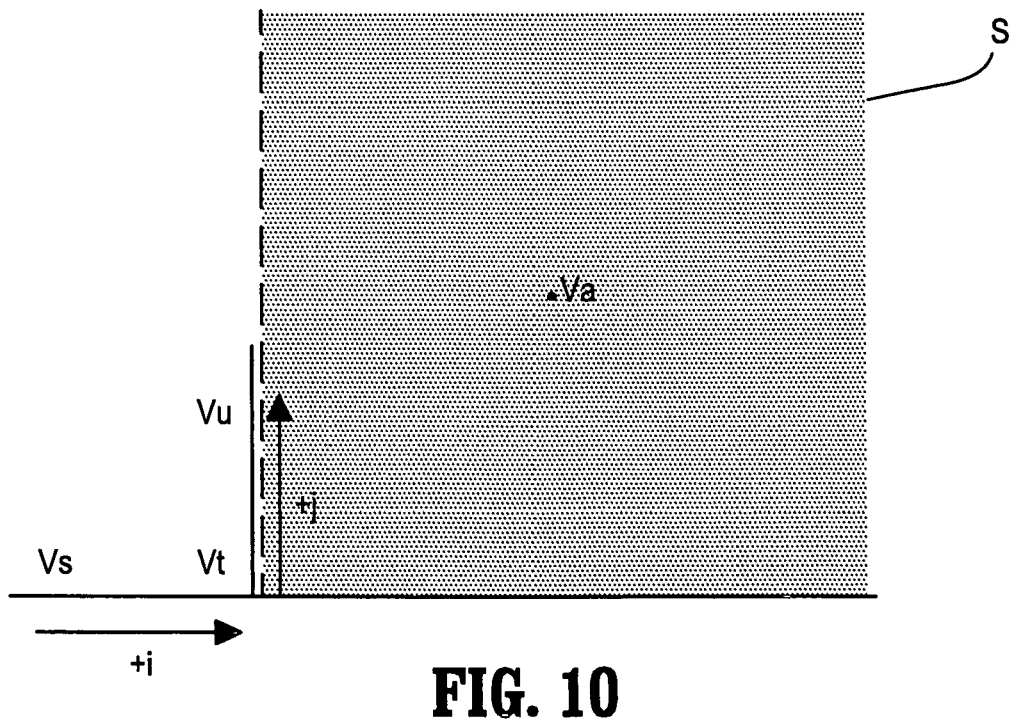
FIG. 10 shows an exemplary decision condition for a point to be in a sector area.

The determination is repeated counterclockwise for all vertexes of the loop, and the index value may be examined at the end to determine that the vertex Va is inside the loop if the index is even, and is outside the loop if the index is odd. For example, in the embodiment in FIG. 8, the point Va is determined to be outside the loop since its count value is 1, and the point Vb is determined to be inside the loop since its count value is 0. Since the edges on the recognition model faces have been already assigned with any of the attributes "+I", "−I", "+J", and "−J", three vertexes Vs, Vt, and Vu that are successive in the counterclockwise direction of the loop can be classified into one of the eight patterns (a) through (h) in FIG. 9. FIGS. 9(a) to (d) show cases where the vertex is convex, and the rest show cases where the vertex is concave. Here, consider the case of FIG. 9(a) as an example of a convex vertex. The decision condition for the point Va to be within the sector area can be expressed by the following expression with reference to FIG. 10:

[Expression 17]

$$j_a - j_t \geq 0, i_a - i_t > 0 \quad (15)$$

(Only one of the expressions includes an equal sign because the index is not counted more than once.) Then, a variable Bt that meets the following condition is newly introduced.

[Expression 18]

$$B_t = \begin{cases} 1 \text{ (if } j_a - j_t \geq 0, i_a - i_t > 0) \\ 0 \text{(otherwise)} \end{cases} \quad (16)$$

Since the condition for a point to be inside a loop is that the index value is even after the loop has been traced once as discussed above, it can be expressed as a linear constraint below using the variable Bt.

[Expression 19]

$$\sum_{t=1}^{n} B_t = 2a, a \text{ is a positive interger} \quad (17)$$

Whereas, the condition for a point to be outside a loop is that the index value is odd as mentioned above, it can be expressed as the expression below.

[Expression 20]

$$\sum_{t=1}^{n} B_t = 2a + 1, a \text{ is a positive interger} \quad (18)$$

Here, the expression (16) relating to the newly introduced variable Bt need to be expressed in linear constraints, the expression (16) can be rewritten as follows by introducing new variables Bt0, Bt1, and Ct for the purpose.

[Expression 21]

$$B_{t0} = \begin{cases} 1 \text{ (if } j_a - j_t \geq 0) \\ 0 \text{(otherwise)} \end{cases},$$

$$B_{t1} = \begin{cases} 1 \text{ (if } i_a - i_t > 0) \\ 0 \text{(otherwise)} \end{cases},$$

$$C_t = B_{t0} + B_{t1}$$

$$B_t = \begin{cases} 1 \text{ (if } C_t - 2 \geq 0) \\ 0 \text{(otherwise)} \end{cases}, \quad (19)$$

Again, the three expressions relating to Bt0, Bt1 and Bt can be rewritten as linear constraint expressions as follows using the method used in determining the intersection of edges shown in FIG. 7 that defines an area between an upper limit line and a lower limit line.

[Expression 22]

$$kb_{t0}B_{t0} > j_a - j_t, kb_{t0}(B_{t0}-1) \pounds j_a - j_t,$$

$$kb_{t1}B_{t1} \geq i_a - i_t, kb_{t1}(B_{t1}-1) < i_a - i_t,$$

$$C_t = B_{t0} + B_{t1},$$

$$kb_t B_t > C_t - 2, kb_t(B_t - 1) \pounds C_t - 2 \quad (20)$$

where kbt0 and kbt1 need to be enough large values as with the case of intersection determination. Kbt does not have to be a large value but can be a small value greater than 2 since Ct can assume only any of values 0, 1, and 2. In a similar way, constraints can be defined for convex vertexes shown in FIGS. 9(b), (c), and (d). Meanwhile, considering FIG. 9(f) as an example of a concave vertex, the condition for the point Va to be in the sector area is:

[Expression 23]

$$j_a - j_t < 0, i_a - i_t \not\le 0 \quad (21)$$

This condition for determining that a point is in the sector area can also be rewritten as a linear constraint expression in a similar operation to the case of a convex vertex, and conditions for FIGS. 9(g), (h), and (i) can be also rewritten as linear constraint expressions.

As a result, the condition for the point Va to be inside the loop can be generated as a pair of an expression similar to the expression (20) relevant to each vertex and the expression (17). The constraint for the point Va to be outside the loop, on the other hand, can be generated as a pair of an expression similar to the expression (20) relevant to each vertex and the expression (18).

The general method for determining whether a point is inside or outside a loop and generating constraints have been so far described. The following will describe the processing done at step S22 using the constraints for determining if a point is inside or outside.

1) All faces that constitute a recognition model are placed in a list.

2) The faces are retrieved from the list one by one, and the following process will be repeated until the list is emptied.

2-1) The constraint for a vertex of an inner loop to be inside the outer loop of a face is added.

2-2) The constraint for a vertex of one inner loop to be outside another inner loop is added for a combination of inner loops of the face.

Each of the steps above can be performed to provide correct determination of inside and outside. However, if the constraints for determination of inside and outside according to the invention are added for all elements in a recognition model, time required to solve an integer programming problem would significantly increase and hardware resource such as computation time and memory could be wasted. Further, in the processing of 2-2), the number of constraints may explode depending on combinations of inner loops. In practice, it is thus also possible to solve the integer programming problem once and add constraints only for loop pairs that have a loop reversal. This approach will be described in more detail in the second embodiment of the invention.

Figure 11:
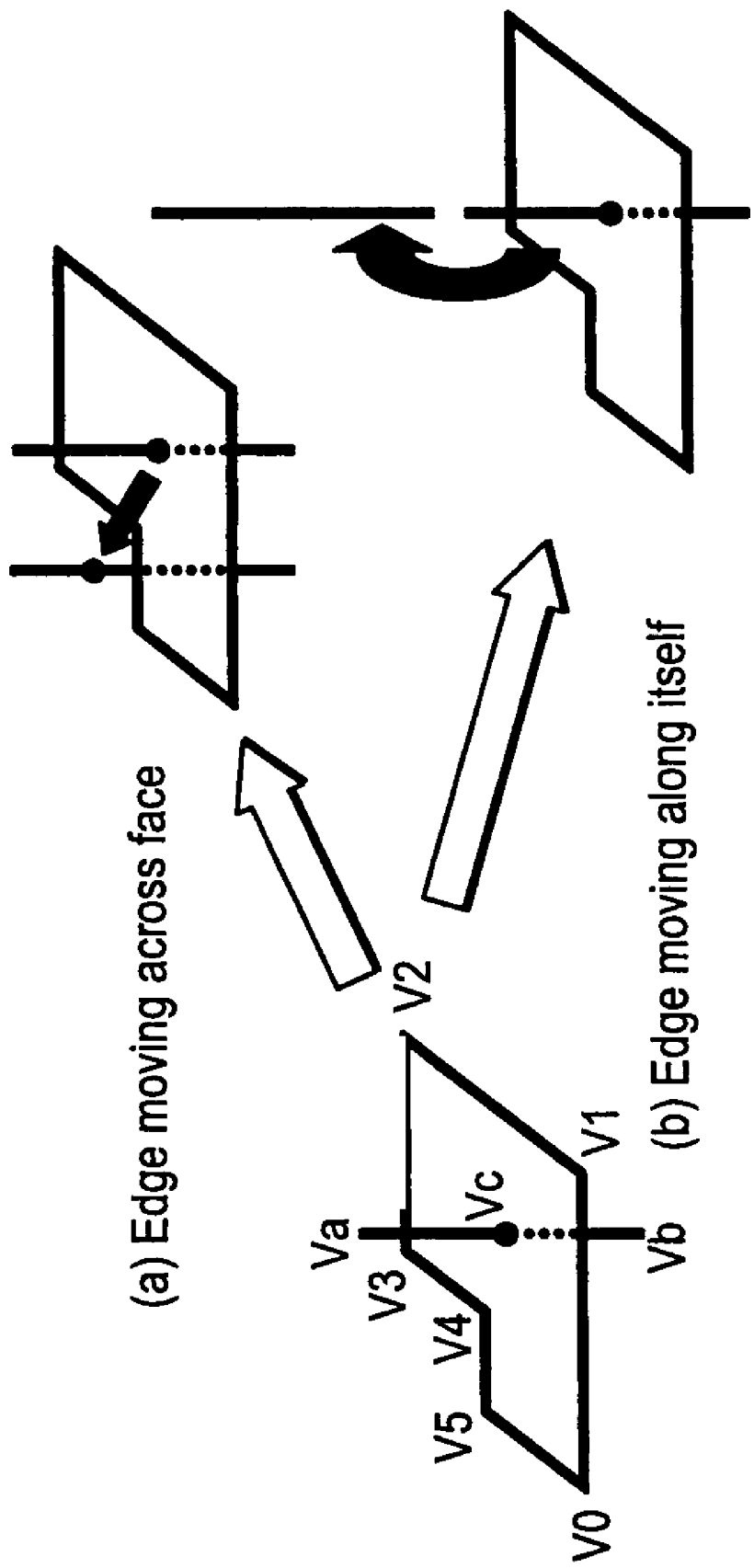
FIG. 11 generally illustrates how intersection of an edge and a face can be resolved in the invention.

G: Step of Generating Constraints for an Edge and a Face not to Intersect Spatially This paragraph describes the process at step S24 in FIG. 1 that determines the state of FIG. 2(d) and solves the problem. The decision condition used at Step S24 in FIG. 1 ensures that an edge and a face of a recognition model do not intersect spatially. As shown in FIG. 11, there are two ways of resolving the intersection of an edge and a face. The first is to move the intersecting point of an edge and a face outside the face (FIG. 11 (a)), and the second is to move the edge so that both of its endpoints are above either side of the face (FIG. 11 (b)). The approach illustrated in FIG. 11 (a) can be described as a constraint for an intersecting point to be outside a loop as described at step S22, and the approach in FIG. 11 (b) can be described as a constraint similar to one for edges not to intersect one another as described at step S20. The constraint generated at step S24 requires that either (OR) of these two constraints be met. Thus, the constraints for step S24 can be generated as a decision condition and a constraint condition by eliminating (OR) using a way similar to the expressions (9) and (11).

H: Step of Solving an Integer Programming Problem

This step S26 solves an integer programming problem using constraints by minimizing the objective function that has been determined and generated at steps S16 to S24. Step S26 can employ any of known existing integer programming solvers. As a result, the number of divisions for each edge can be determined. At step 26, moreover, the approach described in connection with step S12 is used to calculate ijk coordinate values of all vertexes of a recognition model from the number of edge divisions. Given that any vertex of a recognition model is defined as the origin [i,j,k]=[0,0,0], ijk coordinate values of other vertexes can be described with the number of edge divisions, thus ijk coordinates can be calculated in that way when the number of edge divisions have been calculated.

In the following, the second embodiment of the method for generating a structured mesh according to the invention will be described. The second embodiment of the method for generating a structured mesh of the invention uses an approach of adding constraints and solving integer programming problems for all edges and faces iteratively and adaptively. The method described above and illustrated in FIG. 1 involves generating all necessary constraints before solving the integer programming problem. For economy of hardware resource and processing time, however, it is also possible to use an approach that determines necessary constraints for edges and faces and solves an integer programming problem using the constraints successively.

Figure 12:
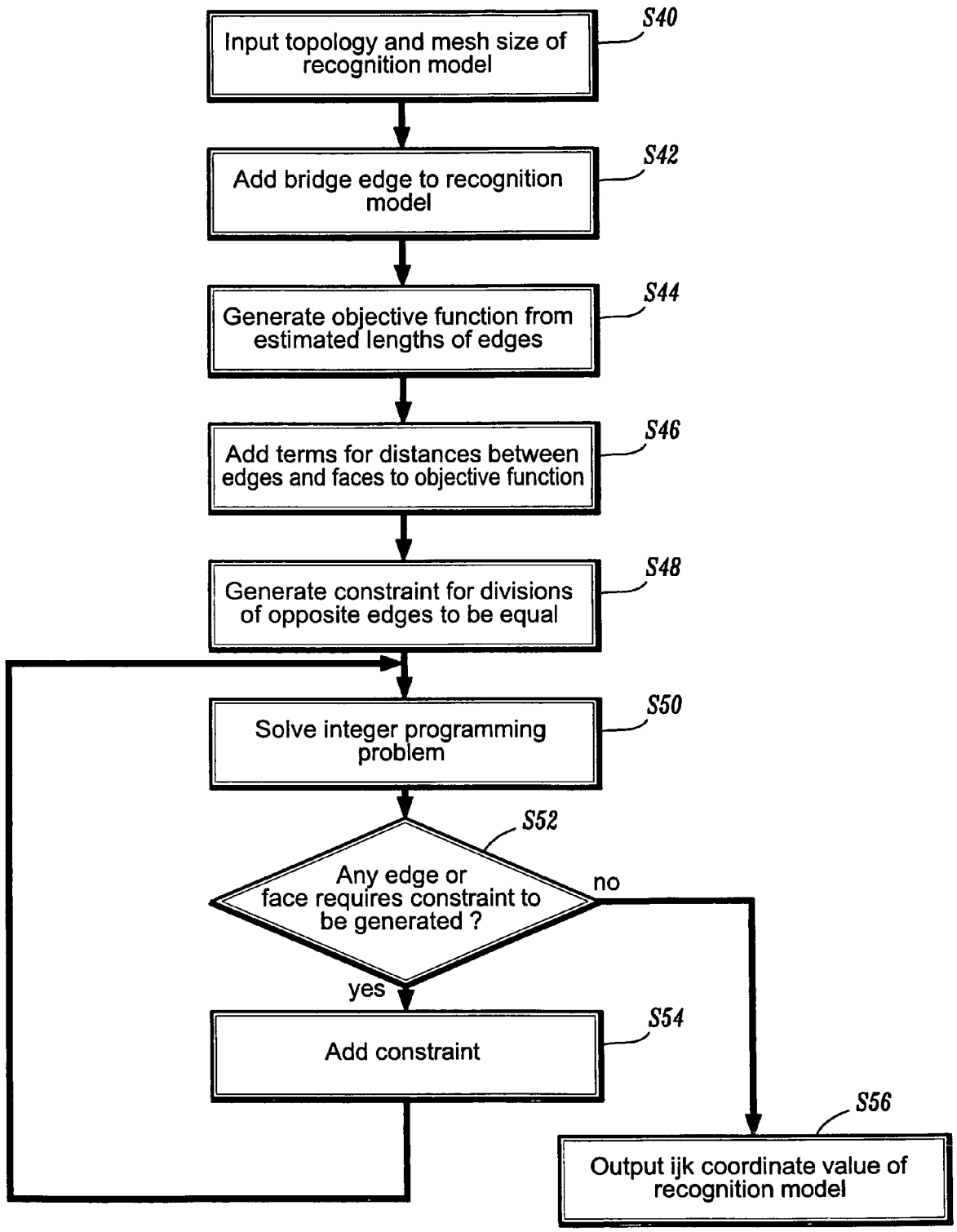
FIG. 12 is a flowchart showing the process of a second embodiment of the recognition model generation method of the invention.

FIG. 12 shows a flowchart illustrating the process in the second embodiment of the method for generating a structured mesh according to the invention. The process inputs the topology of a recognition model and a mesh size at step S40 and adds a bridge edge to the recognition model at step S42. And it generates an objective function from estimated lengths of edges at step S44 and adds terms for distances between edges and between faces to the objective function at step S46. Then, at step S48, the constraint for the numbers of divisions of opposite edges to be equal is generated.

At step S50, the process in the second embodiment of the invention once solves the integer programming problem under the constraint described above. At step S52, it executes the above-mentioned determination for computed edges and faces, and determines whether or not there is any edge and face for which constraints need to be added. If it is determined that there are edges and faces for which constraints should be added (yes), the process adds appropriate constraints at step S54 and returns to step S50 to solve the integer programming problem again, repeating these steps until there is no constraints generated. If there is no edge or face for which constraints need to be added at the determination at step S52, the process proceeds to step S56 to output the ijk coordinates of the structured mesh obtained for the recognition model.

FIG. 13 illustrates an embodiment of a pseudo code for executing the process from step S50 through S54.

Figure 14:
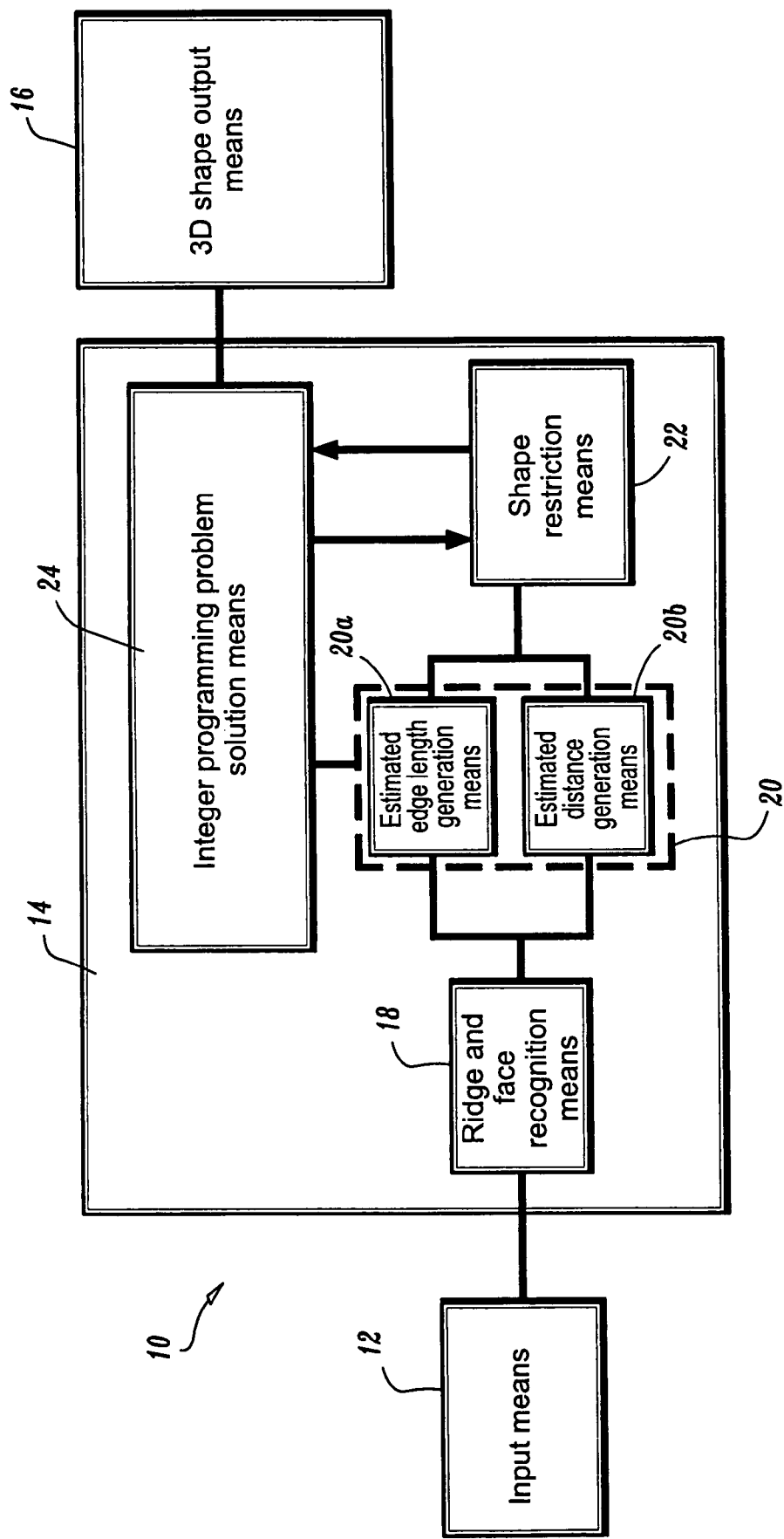
FIG. 14 is a functional block diagram of a first embodiment of the recognition model generation system of the invention.

FIG. 14 shows a functional block diagram of a system for implementing the method for generating a recognition model of the invention as described above. A system 10 in the figure comprises a three-dimensional shape input means 12, a recognition model generation means 14, and a three-dimensional shape output means 16 for outputting generated recognition models. The input means 12 maintains numerical data relating to position coordinates of three-dimensional shapes and inputs numerical data for three-dimensional shapes to the recognition model generation means 14.

The recognition model generation means 14 may comprise a personal computer or workstation provided with a central processing unit (CPU). A personal computer or workstation that can be used with the invention includes, but not limited to, a personal computer or workstation that can include a CPU such as PENTIUM® or a CPU interchangeable therewith and that can run an operating system such as WINDOWS®, WINDOWS®NT, WINDOWS®XP, OS/2 (a trademark of International Business Machines Corporation), AIX (a trademark of International Business Machines Corporation), UNIX® and LINUX.

The recognition model generation means 14 further comprises an edge and face recognition means 18, a shape restriction value generation means 20, and a shape restriction means 22, which can be implemented as software modules or the like. The edge and face recognition means 18 analyzes the labeling of faces or edges applied to data on three dimensional shapes that is input by the input means 12, identifies the label of the edges and faces, and determines edges and faces for generating a recognition model.

The shape restriction value generation means 20 generates variables that restrict shapes so that there will no incompleteness of shape recognition that can be encountered even when edges and faces of a recognition model are topologically consistent. More specifically, the shape restriction value generation means 20 comprises an estimated edge length generation means 20a and an estimated distance generation means 20b, as shown in FIG. 14. The estimated edge length generation means 20a calculates estimated edge lengths to be used as shape restriction values and passes them to an objective function defining the length of edges that is maintained by the shape restriction means 22 implemented as a software module, as described above. Similarly, the estimated distance generation means 20b calculates estimated distances between edges or faces and passes the generated values as variables to an objective function defining the distance between edges or faces that is maintained by the shape restriction means 22.

In the invention, the shape restriction value generation means 20 can include memory for temporarily storing variable values until they are required. In another embodiment of the invention, generated shape restriction values may be temporarily stored in a memory means provided in an appropriate portion of the recognition model generation means 14 or any one of the means constituting the recognition model generation means 14.

The shape restriction means 22 maintains an objective function that contain terms relating to estimated edge length and terms relating to estimated distances that function as shape restriction values in the invention, in addition to existing known constraints. At the request of an integer programming problem solution means 24, which is implemented as another software module for minimizing the above-mentioned objective function using constraints, the shape restriction means 22 in FIG. 14 causes it to operate allowing optimal recognition models and structured mesh to be generated. In the invention, although each of the functional means described above is shown to be a separate module, the modules may all be implemented integrally as an integer programming problem solution module, for example.

In the first embodiment of the invention, the recognition model generation system 10 iteratively computes coordinates of recognition model vertexes by executing the computation of the objective function and constraints for all edges and faces maintained at the shape restriction means 22. Computed vertex coordinates ijk of a recognition model are output to the output means 16 to be displayed on a display means not illustrated, and iterative calculation can be stopped at a desired stage. The iterative calculation may be terminated by a user through visual determination of a recognition model outputted on a display, or a computer may decide the termination by setting an appropriate termination condition. The position coordinates of recognition model vertexes and the position coordinates of a structured mesh that have been output could be stored on an appropriate storage medium in an appropriate format. In a preferred embodiment of the invention, the recognition model generation system may comprise means for smoothing a recognition model.

Figure 15:
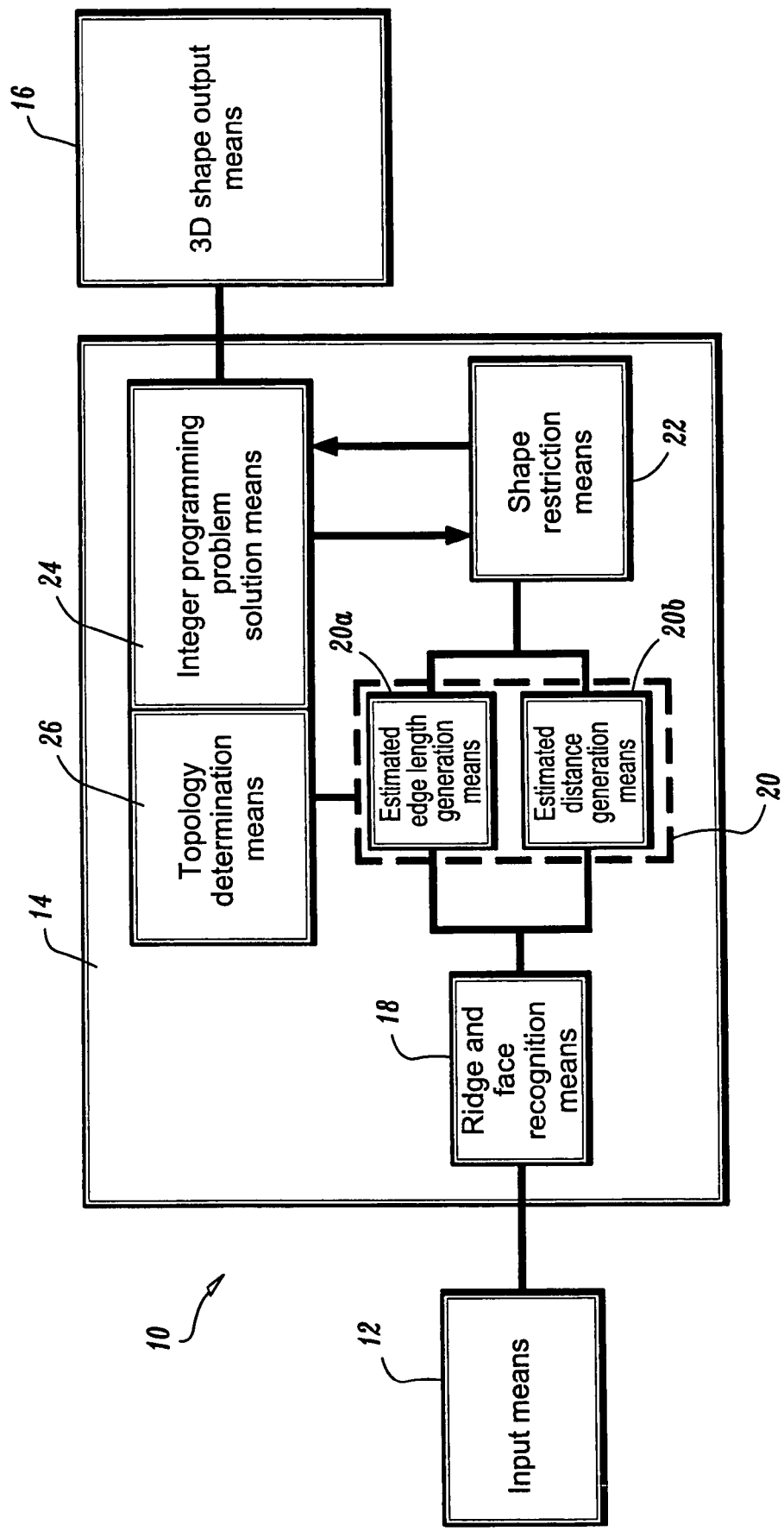
FIG. 15 is a functional block diagram of a second embodiment of the recognition model generation system of the invention.

FIG. 15 illustrates the second embodiment of the recognition model generation system 10 of the invention. The recognition model generation system 10 in FIG. 15 has a topology determination means 26 provided for the integer programming problem solution means 24. The topology determination means 26 determines topological inconsistency of edges and faces using constraints based on the labeling of the edges and faces recognized by the edge and face recognition means 18, and passes the result to the integer programming problem solution means 24 along with data on the edges and faces. The integer programming problem solution means 24 receives the output from the topology determination means 26 and obtains constraints required for inconsistent edges or faces from the shape restriction means 22, and solves an integer programming problem under corresponding constraints and with objective functions for the edges and faces to which the constraints correspond, as shown in FIG. 13.

Since the embodiment of FIG. 15 does not require constraints and objective functions to be calculated for all edges and faces, computation time degeneracy and hardware resource savings can be realized, further improving the applicability of the recognition model generation system of the invention.

The program for implementing the recognition model generation method of the invention can be described with various programming languages such as C, C++, Java®, etc., and the code describing the program can be stored on a computer readable storage medium such as a magnetic tape, flexible disk, hard disk, compact disk, magneto-optical disk, and digital versatile disk (DVD).

EXAMPLE 1

A recognition model was generated with the inventive method and compared with its input three-dimensional shape. The Example 1 sets forth a case where a recognition model was generated and ijk coordinates of the model's structured mesh were calculated. The process employed such an approach that the objective function proposed by Tam et al. was used as an existing objective function and the objective functions for restricting shape recognition in accordance with the invention was incorporated, and constraints were added repeatedly as illustrated in FIGS. 12 and 13 in accordance with the invention. The termination of the integer programming problem solution means was decided by visually comparing the shape of the recognition model shown on a display with an input three-dimensional shape.

Figure 16:
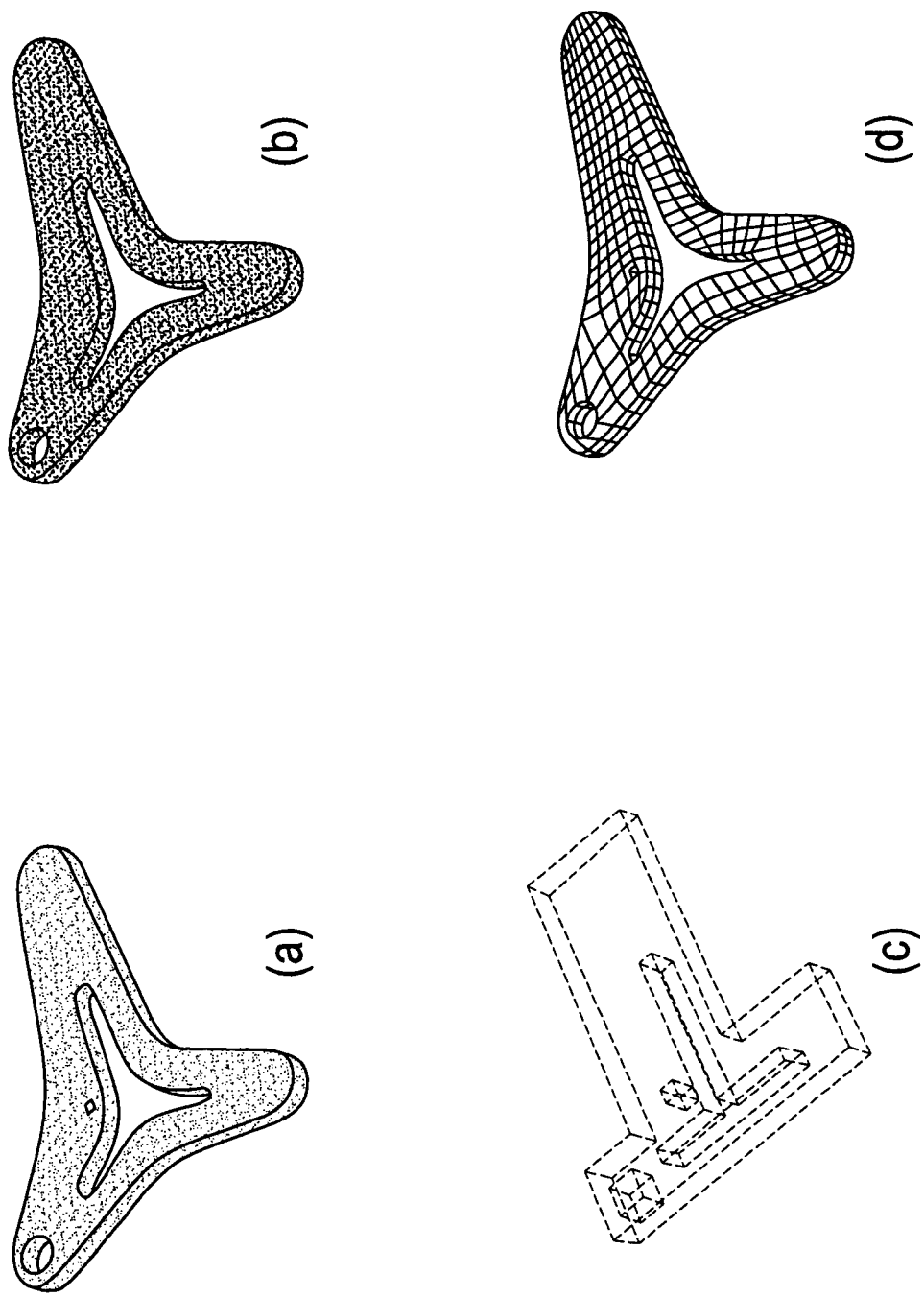
FIG. 16 illustrates three-dimensional shapes that are generated in generating a recognition model in the invention.
Figure 18:
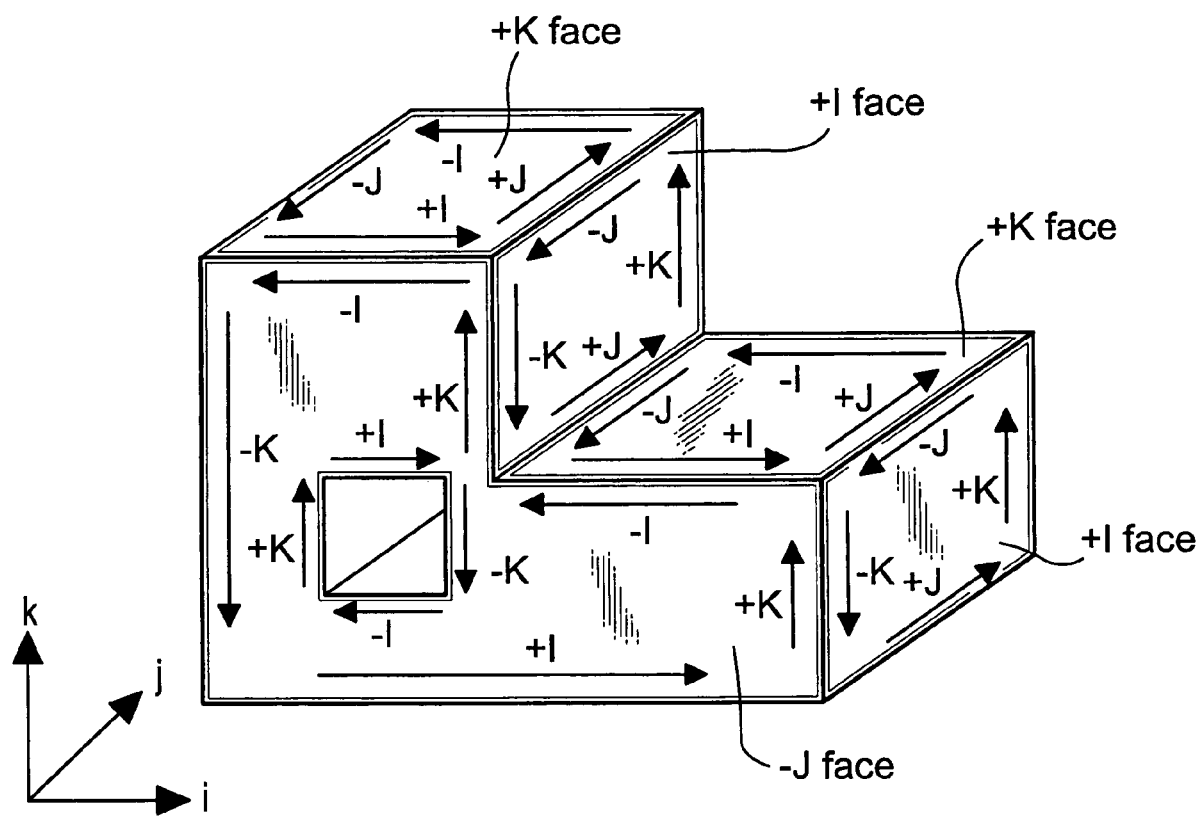
FIG. 18 illustrates the definition of labeling for a recognition model, its faces and edges that is used in the invention.
Figure 19:
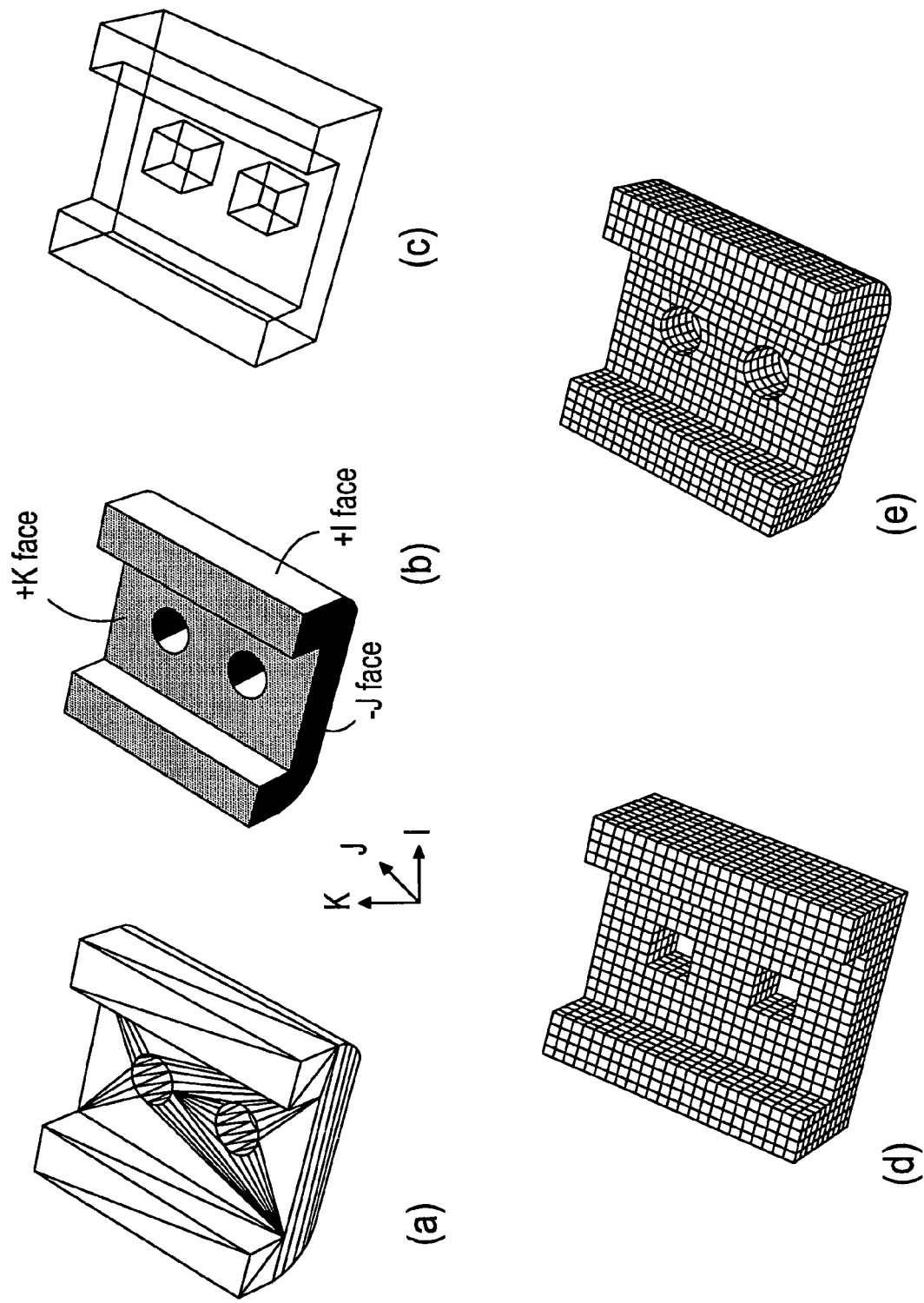
FIG. 19 illustrates a conventional procedure of recognition model generation.
Figure 20:
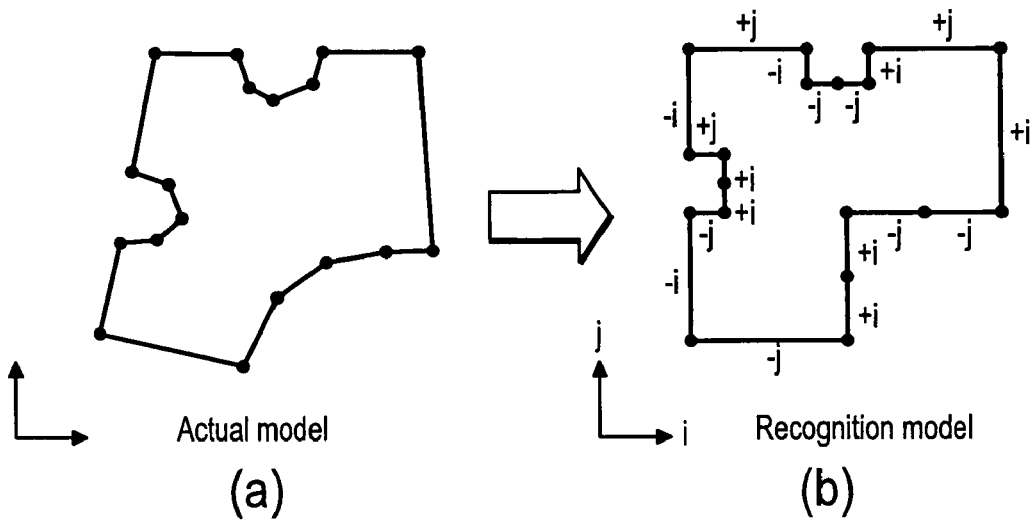
FIG. 20 generally illustrates a conventional method of mesh generation.
Figure 21:
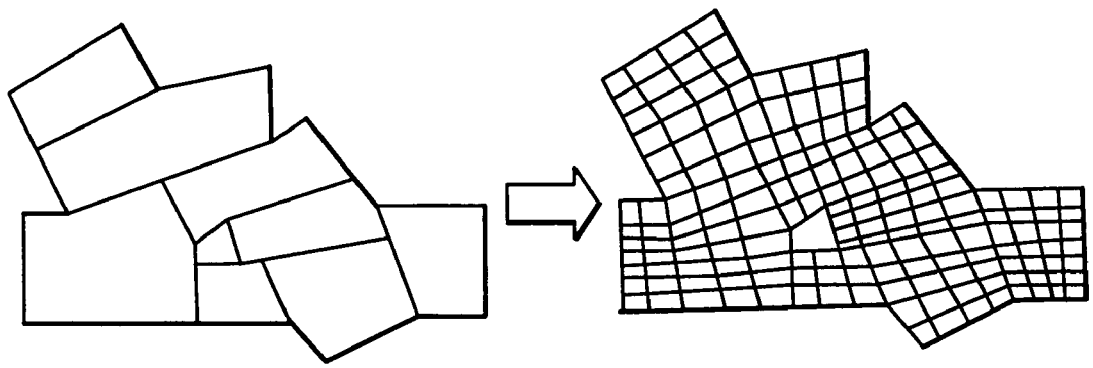
FIG. 21 generally illustrates a conventional method of structured mesh generation.
Figure 22:
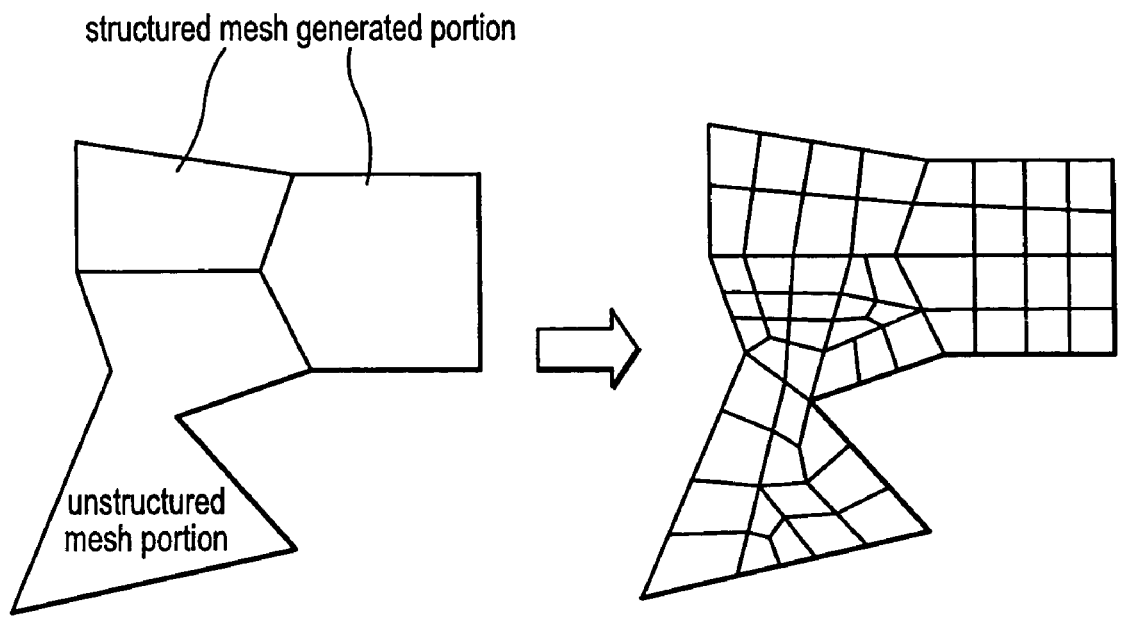
FIG. 22 shows another conventional method of structured mesh generation.
Figure 23:
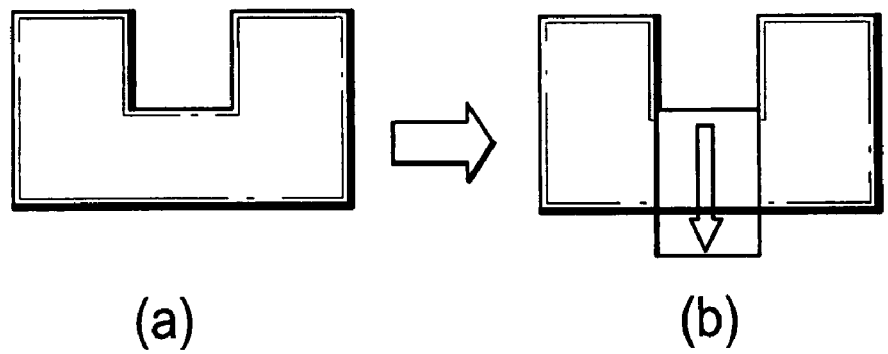
FIG. 23 generally illustrates the inconvenience of degeneracy and interference in a recognition model in a two-dimensional shape.

FIG. 16 illustrates three-dimensional shapes that are generated in the process of recognition model generation. FIG. 16(a) is a three-dimensional shape to be used as input data, and 16(b) illustrates a result at some midpoint whose surface has been divided into triangles to be used for allowing its edges and faces to be recognized. FIG. 16(c) is a recognition model generated with the approach of the invention. FIG. 16(d) shows a final result that can be obtained after edge processing has been applied and a hexahedral mesh has been generated on the recognition model in FIG. 16(c) derived in accordance with the invention. As can be seen in FIG. 16, in accordance with the invention, a recognition model can be constructed that corresponds to its input three-dimensional shape and has a proper structured mesh generated thereon.

EXAMPLE 2

The invention examined the way of generating a recognition model with its shape recognized properly without interference or degeneracy of edges and faces under the same condition as in the Example 1. FIG. 17 illustrates an embodiment that generates the recognition model shown in FIG. 16(c) with the method of the invention. For the sake of clarity, FIG. 17 illustrates three-dimensional recognition models in a two-dimensional orientation.

As can be seen in FIG. 17(a) to (g), integer programming problems are calculated seven times in FIG. 17, and a consistent recognition model is finally obtained as shown in FIG. 17(g). FIG. 17(a) shows a result of solving an integer programming problem only under "the constraint for the numbers of divisions of opposite edges to be equal". It can be seen that interference has occurred to loops under the constraints only. Subsequently, FIGS. 17(b) to (d) calculate the model specifying edges and faces and adding constraints so that the T-shaped inner loop and the outer loop does not interact. FIG. 17(e) shows a result that is output at a stage at which computation has been executed such that the upper left inner loop does not interact with the outer loop. FIGS. 17(f) and (g) calculate so that the remaining small inner loop in the central portion does not interact with other inner loops or the outer loop. As a result, a recognition model without interference can be generated as shown in FIG. 17(g).

According to the invention, when the number of divisions of edges on a recognition model that may include concave portions has been improperly computed, the number of edge divisions can be determined in consideration of conditions for eliminating the possibility that the shape of the recognition model to be determined from the number may itself include degeneracy or interference, thereby ensuring that problems such as degeneracy and interference will not occur. Therefore, according to the invention, particularly the number of edge divisions can be determined reliably even for a recognition model with a concave portion.

Moreover, the invention can restrict shapes so that an input shape and its recognition model will be as similar as possible, it thus generates a recognition model closer to an input shape automatically, accordingly improving the quality of a resulting structured mesh.

Although the invention has been thus far described with specific embodiments illustrated in the drawings, the invention is not limited to those particular embodiments, but various modifications and other embodiments, or any of existing components may be used in the scope of the invention. All such modifications are intended to be within the scope of the invention as defined in the appended claims.

What is claimed is:

1. A method of generating an optimized recognition model of a three-dimensional (3D) shape, comprising the steps of:
   receiving input data on a three-dimensional (3D) shape that includes edges and faces of the 3D shape;
   generating a recognition model of the 3D shape using the input data;
   adding a bridge edge to the recognition model that connects a vertex on an outer loop of a face in the recognition model to a vertex of an inner loop of the face;
   using the bridge edge to generate a number of edge divisions of each edge in the recognition mode;
   generating an objective function from terms relating to the generated edge divisions and estimated edge divisions of the recognition model; and
   generating coordinate values of an optimized recognition model by minimizing the objective function.

2. The method of claim 1, further comprising subjecting the objective function to constraints that require divisions of opposite edges of the recognition model to be equal.

3. The method of claim 1, further comprising subjecting the objective function to constraints that prevent edges of the recognition model from intersecting.

4. The method of claim 1, further comprising subjecting the objective function to constraints that prevent reversal of inner and outer loops of the recognition model.

5. The method of claim 1, further comprising subjecting the objective function to constraints that prevent spatial intersection of edges and faces of the recognition model.

* * * * *